(12) United States Patent
Saito

(10) Patent No.: US 6,693,868 B2
(45) Date of Patent: Feb. 17, 2004

(54) DISC DRIVE HAVING FEED CHASSIS SUPPORTING MEMBERS

(75) Inventor: Akio Saito, Kanagawa (JP)

(73) Assignee: Mitsumi Electric Company Ltd., Tokyo (JP)

( * ) Notice: Subject to any disclaimer, the term of this patent is extended or adjusted under 35 U.S.C. 154(b) by 458 days.

(21) Appl. No.: 09/738,711

(22) Filed: Dec. 15, 2000

(65) Prior Publication Data

US 2001/0021155 A1 Sep. 13, 2001

(30) Foreign Application Priority Data

Feb. 8, 2000 (JP) ........................................ 2000-030610

(51) Int. Cl.[7] .......................... G11B 33/08; G11B 33/02
(52) U.S. Cl. ..................................................... 369/75.1
(58) Field of Search .............................. 369/75.1, 75.2, 369/77.1, 263; 312/330.1, 223.2; 360/132; 361/683, 684, 685, 686, 687, 688, 689, 736, 737

(56) References Cited

U.S. PATENT DOCUMENTS

| | | | | | |
|---|---|---|---|---|---|
| 5,301,179 A | * | 4/1994 | Okamoto | .................... | 369/77.2 |
| 5,621,713 A | * | 4/1997 | Sato et al. | ................... | 369/75.2 |
| 5,691,969 A | * | 11/1997 | Fujisawa | .................... | 369/77.1 |
| 5,694,314 A | * | 12/1997 | Aoki et al. | ................. | 367/75.1 |
| 5,793,729 A | * | 8/1998 | Soga et al. | ................. | 369/75.1 |
| 5,793,730 A | * | 8/1998 | Ootsuka | ..................... | 369/75.1 |
| 5,808,996 A | * | 9/1998 | Aoyama | ..................... | 369/75.1 |
| 6,002,658 A | * | 12/1999 | Aso et al. | ................... | 369/75.1 |
| 6,125,097 A | * | 9/2000 | Wu | ............................. | 369/263 |
| 6,229,781 B1 | * | 5/2001 | Fujisawa | .................... | 369/77.1 |
| 6,411,581 B1 | * | 6/2002 | Saitou et al. | .............. | 367/75.1 |
| 6,426,932 B2 | * | 7/2002 | Omori et al. | .............. | 369/75.1 |
| 6,456,580 B2 | * | 9/2002 | Lee | ............................ | 369/75.1 |

FOREIGN PATENT DOCUMENTS

| | | | | | |
|---|---|---|---|---|---|
| JP | 10-050043 | * | 2/1998 | ................ | 369/75.1 |
| JP | 2001-222877 | * | 8/2001 | ................ | 369/75.1 |

* cited by examiner

Primary Examiner—George J. Letscher
Assistant Examiner—C. R. Beacham
(74) Attorney, Agent, or Firm—Patents + TMS, P.C.

(57) ABSTRACT

A disc drive includes a casing having a bottom cover and an outer cover, a disc tray which supports an optical disc thereon and is movable with respect to the casing between a disc eject position and a disc reproducing position, a loading chassis for supporting and guiding the disc tray, a feed chassis on which a turntable and an optical pick-up are provided, the feed chassis being pivotally displaceable between a raised position for reproducing the disc and a lowered position lower than the raised position, and a main circuit board having a roughly rectangular shape and having various electrical elements for driving and controlling the disc drive. The loading chassis is designed such that it is arranged on a roughly front-half part of the bottom cover, and the main circuit board is designed such that it is arranged on a roughly rear-half part.

30 Claims, 26 Drawing Sheets

(a)

(b)

(a)

(b)

(c)

(a)

(b)

(a)

(b)

(c)

(d)

(a)

(b)

(a)

(b)

(a)

(b)

(c)

(d)

(e)

(a)

(b)

(a)

(b)

(c)

(a)

(b)

(a)

(b)

(a)

(b)

(a)

(b)

(a)

(b)

(c)

(a)

(b)

(a)

(b)

(a)

(b)

(a)

(b)

(a)

(b)

(c)

DISC DRIVE HAVING FEED CHASSIS SUPPORTING MEMBERS

BACKGROUND OF THE INVENTION

1. Field of the Invention

This invention relates to a disc drive, and more particularly relates to a disc drive for reproducing or reproducing and recording a disc-shaped recording medium such as an optical disc.

2. Description of the Prior Art

Disc drives are apparatuses for at least reproducing information recorded in a disc-shaped recording medium such as a compact disc and CD-ROM and the like. In these recording mediums, information is recorded on a signal recording surface (information recording surface) of the disc through a number of pits spirally formed on the information recording surface. By emitting a laser beam onto the surface, the information is reproduced through changes in the magnitude of the light of the reflected beam. Examples of such a disc drive include CD players, CD-ROM drives, DVD drives and the like.

One example of such disc drives is disclosed in Japanese Laid-open Patent Application No. 10-293932 which was filed by the assignee of this application. FIG. 27 is a perspective view of the conventional disc drive and FIG. 28 is an exploded perspective view thereof.

As shown in these drawings, the disc drive 1B comprises a casing 10 having a bottom cover and an outer cover 10b, a main printed circuit board 11 of which width and length are substantially the same as those of the bottom cover 10a of the casing 10, and a chassis provided above the printed circuit board 11. The chassis 40 is formed into a roughly rectangular container-shape having substantially the same width and length as those of the bottom cover 10a. These components are housed within the casing 10 constructed from the bottom cover 10b and the outer cover 10a. The chassis 40 has a bottom portion 40a in which a rectangular shaped opening 41 is formed. In the opening 41, a mechanism unit 42 on which a turntable 46 for rotating a disc 3, a spindle motor for rotating the turntable 46, and an optical pick-up 30 for reproducing or reproducing and recording the disc 3 and the like are provided.

Further, a disc tray 5 for transporting the disc 3 from the outside of the casing into the casing 10 is provided on the chassis so as to be slidably movable with respect to the chassis 40 in the forward and rearward directions.

As described above, the main printed circuit board 11 used in the disc drive 1B has substantially the same width and length as those of the bottom cover 10a of the casing 10, so that the entire surface of the bottom cover 11a of the casing 10 is covered by the printed circuit board 11. When such a printed circuit board 11 is used, it is necessary to form openings 11a and 11b in the printed circuit board 11 as shown in FIG. 28 for connecting the optical pick-up 30 to a connector 45e provided on the under surface of the printed circuit board 11 using a flat cable 30a and for connecting the spindle motor 45 to a connector 45d using a flat cable 45c. This results in the complicated shape of the printed circuit board 11.

Further, as described above, since the printed circuit board 11 used in the conventional disc drive 1b has substantially the same shape as that of the bottom cover 10a of the casing 10, that is a large size printed circuit board is used, many screws are necessary to mount the printed circuit board to the chassis 40, which results in increased assembling steps.

Furthermore, in the conventional disc drive 1B, in order to mount the printed circuit board 11 to the chassis 40, it is necessary to reverse the chassis 40 two or more times when assembling the disc drive, which also results in complicated assembling process.

SUMMARY OF THE INVENTION

In order to solve the problems in the conventional disc drive, the present invention is directed to a disc drive, comprising: a disc tray on which an optical disc is to be placed, the disc tray being movable between a disc ejecting position and a disc reproducing position in front and rear direction; a loading chassis which supports and guides the disc tray during the movement thereof; a feed chassis on which a turntable for rotating the disc and an pick-up at least for reproducing the optical disc are provided, said feed chassis having a rotation axis and a forward portion which is a front side of the rotation axis and on which the turntable and pick-up are arranged, and the front forward portion of the feed chassis being displaceable between a raised position and a lowered position about the rotation axis; a main circuit board having various electrical elements for controlling the turntable and the pick-up arranged on the feed chassis; a casing composed of a bottom cover and an outer cover for housing these elements, the bottom cover having left and right sides; and a pair of feed chassis supporting members respectively provided at the left and right sides of the bottom cover, in which the feed chassis is pivotally supported by the feed chassis supporting members and at least a part of the main circuit is supported by the feed chassis supporting member.

According to the disc drive having the above structure, it is possible to provided a disc dive in which a main circuit board can be easily mounted, thus leading to easy assembling operation.

In the present invention, it is preferred that the bottom cover has a roughly front-half part and a roughly rear-half part, and the loading chassis is arranged on the front-half part and the main circuit board is arranged on the rear-half part, respectively, in such a manner that they are separated from each other. According to this structure, both the loading chassis and the main circuit board cam be directly mounted to the bottom cover of the casing, and this leading to easier assembling operation.

Further, in the present invention, it is preferred that one of the feed chassis supporting members is formed with a positioning means for positioning the main circuit board. In this case, it is also preferred that the positioning means includes a rib which is formed with the feed chassis supporting member and a notch formed in the main circuit boar so as to be engageable with the rib. This also makes it easier to assemble the components of the disc drive.

Furthermore, it is also preferred that one of the feed chassis supporting members is formed with a recess to which the main circuit board is fitted. This also makes it easier to assemble the components of the disc drive.

Moreover, it is also preferred that bottom cover has a pair of upwardly protruding circuit board mounting portions which are located along one of the orthogonal lines of the main circuit board, and the main circuit board is mounted onto the circuit board mounting portions via screws. In this case, it is preferred that one of the circuit board mounting portions is used for grounding the main circuit board.

Moreover, it is also preferred that the electrical parts on the main circuit board includes heat generating electrical parts which are mounted on the under surface of the main circuit board, and heat dissipation sheets are provided between the electrical parts and the bottom cover for transmitting heat generated in the electrical parts to the casing.

Another aspect of the present invention is directed to a disc drive, comprising: a casing having a bottom cover and an outer cover which is joined to the bottom to form a substantially box-shape, the bottom cover having a roughly front-half part and a roughly rear-half part; a disc tray on which an optical disc is to be placed, the disc tray being movable with respect to the casing between a disc ejecting position and a disc reproducing position in front and rear directions; a loading chassis provided within the casing for supporting and guiding the disc tray, the loading chassis being designed so that it is arranged on the front-half part of the bottom cover of the casing; a feed chassis which is provided within the casing and on which a turntable for rotating the disc and an pick-up at least for reproducing the disc are provided, the feed chassis being pivotally displaceable between a raised position at which the disc can be reproduced and a lowered position at which the disc tray can be moved between the disc reproducing position toward and the disc eject position; and a main circuit board having a roughly rectangular shape and having various electrical elements for driving and controlling the disc drive, the main circuit board, being provided within the casing and designed so that it is arranged on the rear-half part of the bottom cover.

According to the structure described above, it is possible to provide a disc drive in which the main circuit board can be mounted easily, since the feed chassis and the main circuit board are separately mounted to the bottom cover directly.

In this structure, it is preferred that the disc drive disc drive further comprises a pair of feed chassis supporting members which are respectively provided at the left and right sides of the bottom cover, in which the feed chassis is pivotally supported by the feed chassis supporting members. In this case, it is preferred the feed chassis is supported by the feed chassis supporting members through elastic members, and the feed chassis is pivotal with respect to an axis connecting the elastic members due to elastic deformation of the elastic members. In this case, it is further preferred that the feed chassis includes a base plate formed into a roughly cross shape having a front extending part, a right extending part, a left extending part and a rear extending part, and the elastic members are provided on the right extending part and the left extending part of the base plate, respectively. These arrangements make it possible to effectively prevent vibration caused by the rotation of the disc from being transmitted to the casing.

Further, in this invention, it is preferred that the feed chassis includes a base plate formed into a roughly cross shape having a front extending part, a right extending part, a left extending part and a rear extending part, and the base plate is designed so that its width including the right extending part and the left extending part is substantially equal to the width of the bottom cover. Use of such a base plate makes it possible to increase the weight of the feed chassis, and this is effective in suppressing the vibration. In this case, it is preferred that each of the right and left extending parts of the base plate has a rear corner, and the feed chassis is pivotal with respect to a pivotal axis connecting points near the rear corners of the right and left extending parts of the base plate.

Furthermore, in this invention, it is also preferred that the disc drive further comprises a mechanism for displacing the front extending part of the base plate in up and down directions. Preferably, the displacing mechanism includes a cam mechanism having a cam which converts rotational motion of the cam into the up and down motion of the front extending part of the base plate.

Moreover, in this invention, it is also preferred that the disc drive further comprises means for supporting and positioning the rear end portion of the disc tray with respect to the rear plate of the casing. Preferably, the supporting and positioning means includes engaging means elastically provided in the rear end portion of the disc tray and engaged means formed on the rear plate of the casing, wherein the engaging means comes to abutment with the engaged means with the engaging means being elastically deformed when the disc tray reaches the disc reproducing position. In this case, it is more preferable that the engaging means includes a pair of elastic arms which are inwardly provided at the opposite rear corners of the disc tray such that they face each other, and each elastic arm includes a leaf spring shaped elastic part which is flexible only in the front and rear directions and an engaging part formed on the tip part of the elastic part. Further, it is also preferred that the engaging part of each elastic arm is formed with a plurality of horizontal grooves and the engaged part of the rear plate of the casing is also formed with a plurality of corresponding horizontal grooves.

These arrangement makes it possible to support and position the rear end part of the disc tray with respect to the rear plate of the casing, and this is very effective in the disc drive of the present invention in which the loading chassis for supporting and guiding the disc tray is designed so that it is arranged on the front-half part of the bottom cover of the casing.

Moreover, in this invention, it is also preferred that the disc drive further comprises means for preventing a disc which has been removed from the disc tray within the casing from being left inside the casing when the disc tray is ejected. Preferably, the means includes a projection extending from the top plate toward the disc tray, and the projection is provided on the top plate so that the projection is positioned near and outside the outer periphery of the disc placing portion of the disc tray when the disc tray is in the reproducing position.

These and other objects, structures and advantages of the present invention will be apparent when the following detailed description of the preferred embodiments will be considered taken in conjunction with the appended drawings.

BRIEF DESCRIPTION OF THE DRAWINGS

FIGS. 4(a) and 4(b) are a side view of the disc drive shown in FIG. 3 viewed from the right side thereof, in which FIG. 4(a) shows a state that a disc tray is in the disc eject position and a feed chassis is in the lowered position, FIG. 4(b) shows a state that the disc tray is in the disc reproducing position and the feed chassis is in the raised position.

FIGS. 7(a) to 7(c) are illustrations which respectively show the relative positional relationships among the disc, the disc tray, the casing and a disc stopper provided on the casing during the movement of the disc tray on which the disc is placed between the disc eject position and the disc reproducing position, in which FIG. 7(a) shows the state that the disc tray is moved from the disc eject position toward the disc reproducing position, FIG. 7(b) shows the positional relationship when the disc tray is in the disc reproducing position, and FIG. 7(c) shows the state that the disc is removed from the disc placing portion of the disc tray. Further, FIG. 7(d) is an illustration of the conventional disc drive having no disc stopper, which shows the state that the disc is removed from the disc placing portion of the disc tray.

FIGS. 17(a) and 18(b) are illustrations which show the state that an engaging part of a rear end supporting portion formed in the disc tray comes to abutment with an engaged part formed in the casing due to the movement of the disc tray, in which FIG. 17(a) shows a state just before the engaging part is abutted with the engaged part, and FIG. 17(b) shows a state that the engaging part is in engagement: with the engaged part.

FIGS. 18(a) and 18(b) are respectively a top plan view and a right side view of the feed chassis.

FIGS. 22(a) and 22(b) are a top plan view of the loading chassis provided with a loading cam mechanism, in which FIG. 22(a) shows a state that a cam wheel is in a first position, and FIG. 22(b) shows a stated that the cam wheel is in a second position.

FIGS. 23(a) and 23(b) are respectively a perspective view which shows the operation of the loading cam mechanism having a first pulley, a second pulley, a belt, a drive gear and the cam wheel, in which FIG. 23(a) shows a state that the cam wheel is in the first position and FIG. 23(b) shows a state that the cam wheel is in the second position.

DETAILED DESCRIPTION OF THE PREFERRED EMEBODIMENTS

Hereinbelow, a preferred embodiment of the disc drive according to the present invention will be described in detail with reference to the appended drawings.

Figure 1:
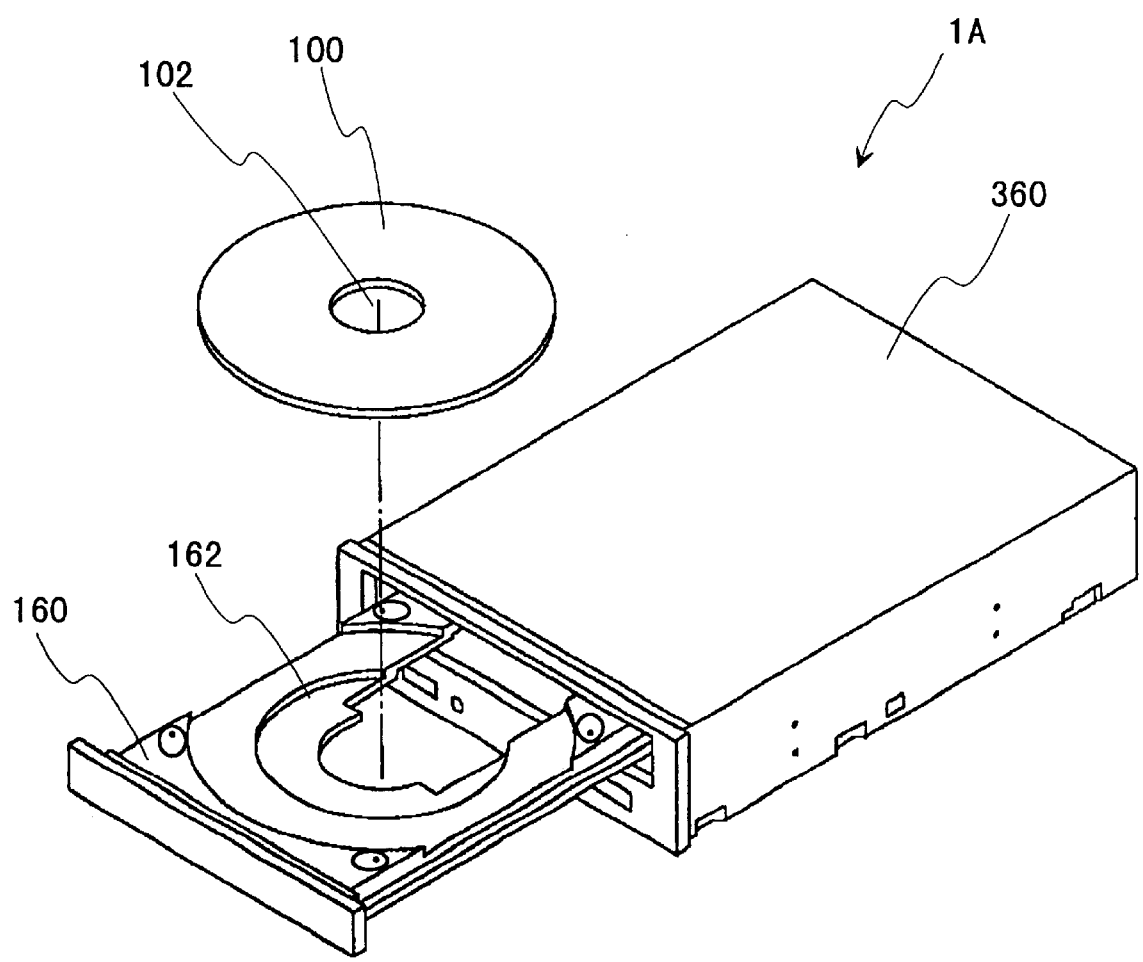
FIG. 1 is a perspective view which shows an overall structure of a disc drive 1A according to the present invention.
Figure 2:
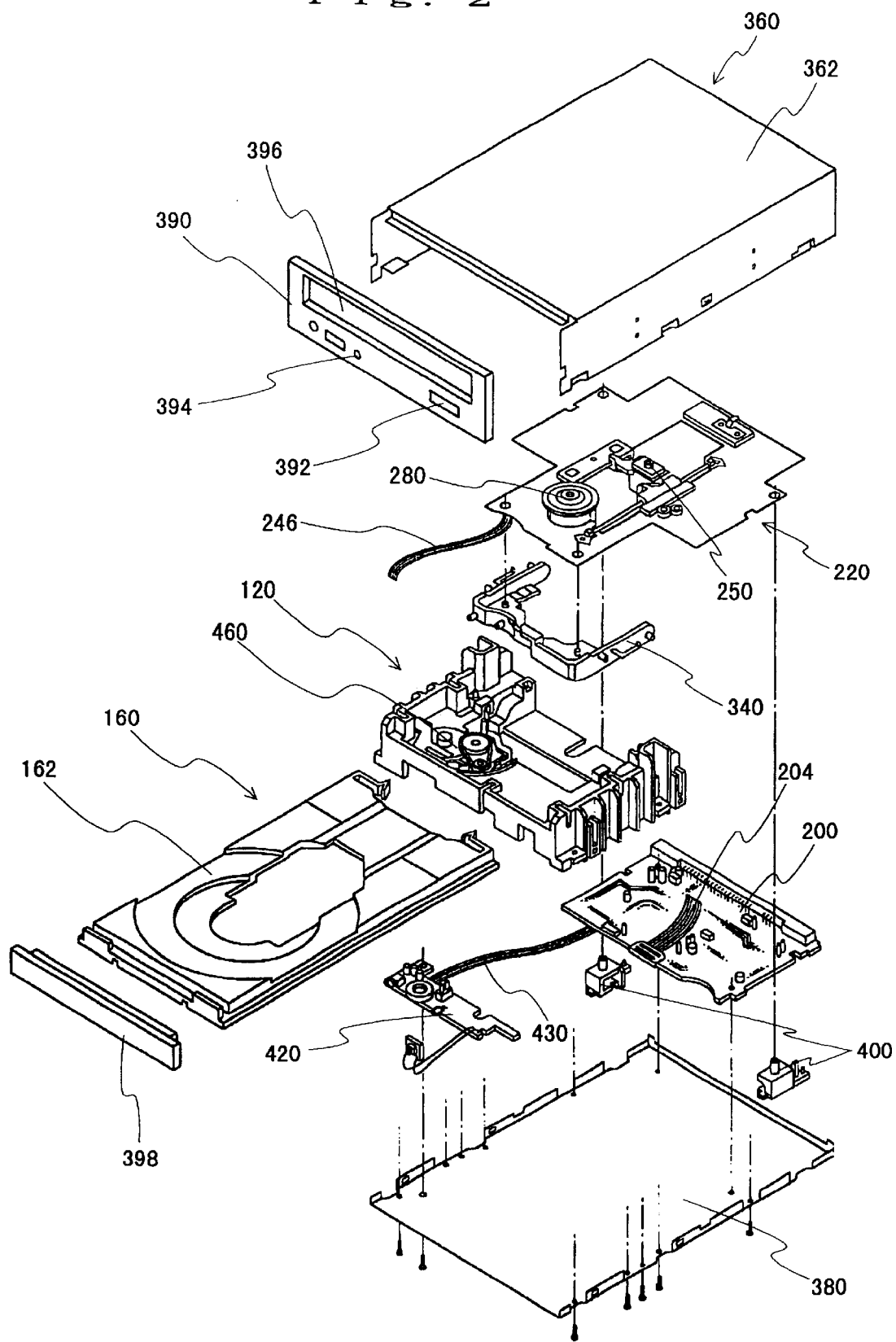
FIG. 2 is an exploded perspective view which shows the overall structure of the disc drive 1A of the present invention.

FIG. 1 is a perspective view which shows an overall structure of a disc drive 1A according to the present invention, and FIG. 2 is an exploded perspective view which shows the overall structure of the disc drive 1A of the present invention.

As shown in FIGS. 1 and 2, the disc drive 1A of the present invention is an apparatus for reproducing or reproducing and recording of an optical disc 100 such as CD-ROM, music CD and DVD and the like. The apparatus is generally comprised of a loading chassis 120; a disc tray 160 for transporting the disc 100, the disc tray having a disc placing portion (disc supporting portion) on which the disc 100 is to be placed and being constructed so as to be movable in forward and backward directions with respect to the loading chassis 120 between a disc eject position and a disc reproducing position (disc loaded position); a main printed circuit board (hereinafter, simply referred to as "main circuit board") 200 disposed at the rear side of the loading chassis 120; a feed chassis on which a turntable 280 for rotating the disc 100 and an optical pick-up 250 for reproducing or reproducing and recording of the optical disc 100 and the like are provided; a pivotal frame 340 for pivotally displacing the feed chassis 220 between a raised position and a lowered position; a loading cam mechanism 460 provided in the loading chassis 120 for moving the disc tray 160 and for operating the pivotal frame 340; and a casing 360 for housing these components.

Figure 3:
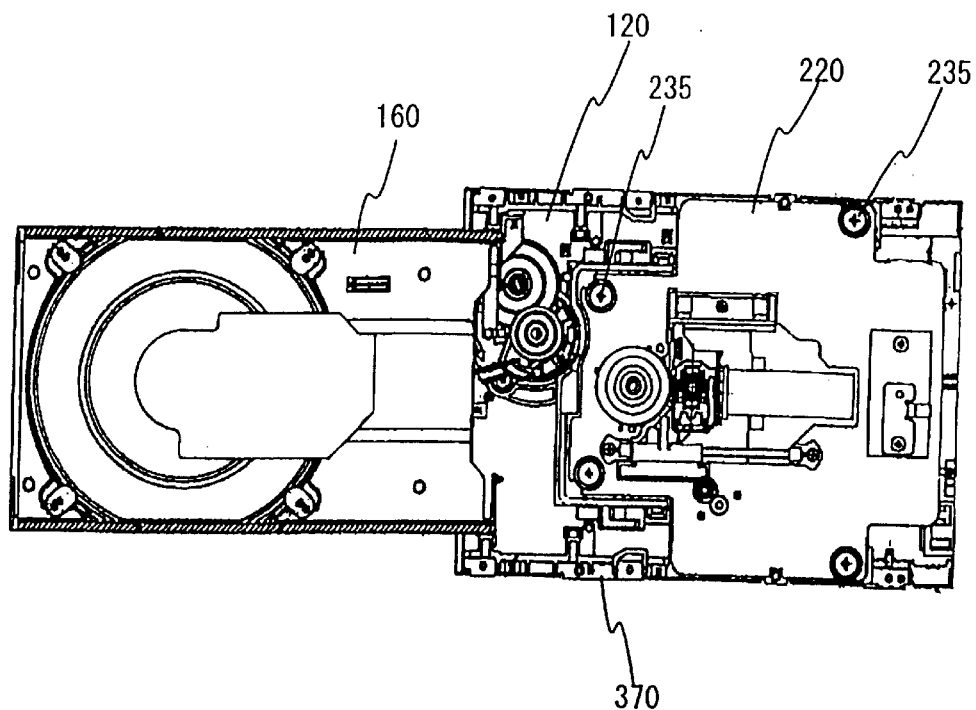
FIG. 3 is a top plan view of the disc drive from which an outer cover of a casing is removed.

FIG. 3 is a top plan view of the disc drive 1A from which an outer cover of the casing 360 is removed. This figure shows a state that the disc tray 160 is in the disc eject position and the feed chassis 220 is in the lowered position.

FIGS. 4(a) and 4(b) are a side view of the disc drive 1A shown in FIG. 3 viewed from the right side thereof, in which FIG. 4(a) shows a state that the disc tray 160 is in the disc eject position and the feed chassis 220 is in the lowered position, FIG. 4(b) shows a state that the disc tray 160 is in the disc reproducing position and the feed chassis 220 is in the raised position.

Hereinbelow, the detailed structure of the respective components will be described.

As shown in FIG. 2, the casing 360 is roughly composed of a bottom cover 380 which forms a bottom surface of the disc drive 1A, an outer cover 362 provided on the bottom cover 380 to form an upper surface, left and right side surfaces and a rear surface of the disc drive, and a front bezel 390 attached to the front portions of the bottom cover 380 and the outer cover 362.

Figure 4:
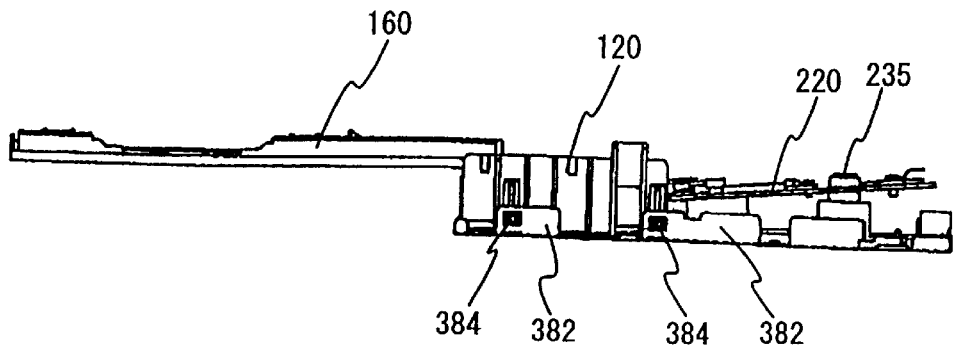
Figure 4:
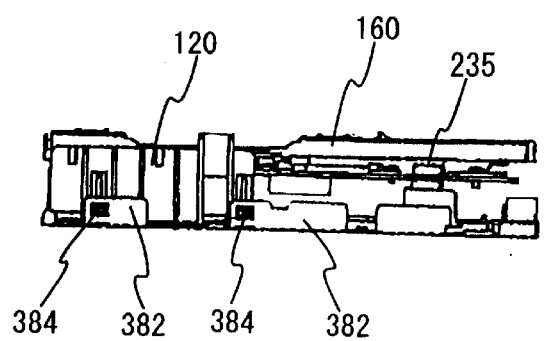
Figure 13:
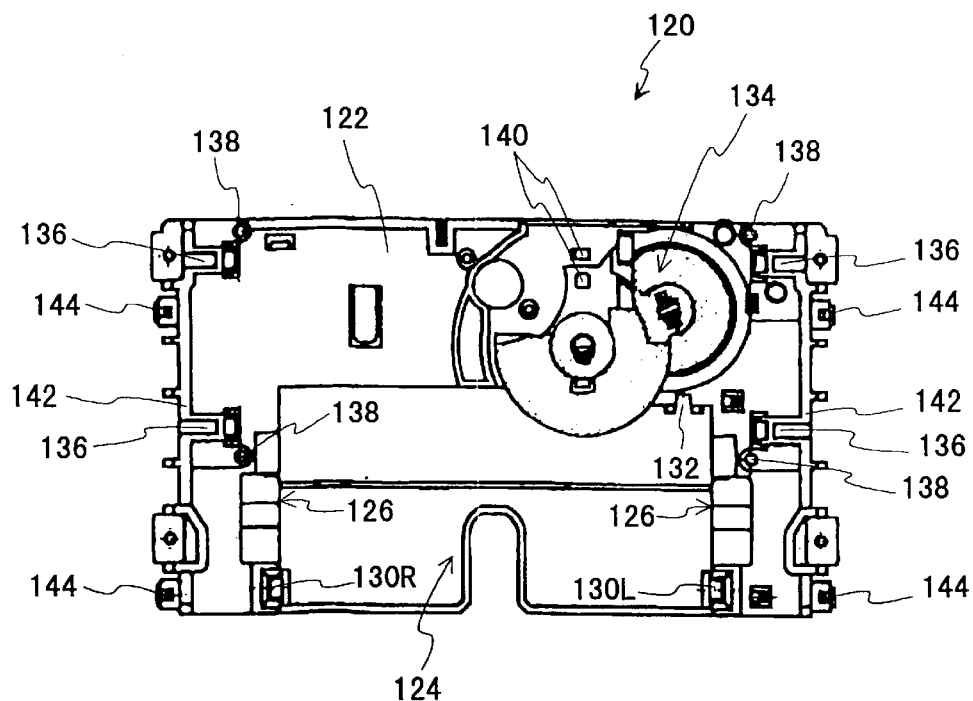
FIGS. 13(a) and (b) are respectively a top plan view and a bottom view of the loading chassis.
Figure 13:
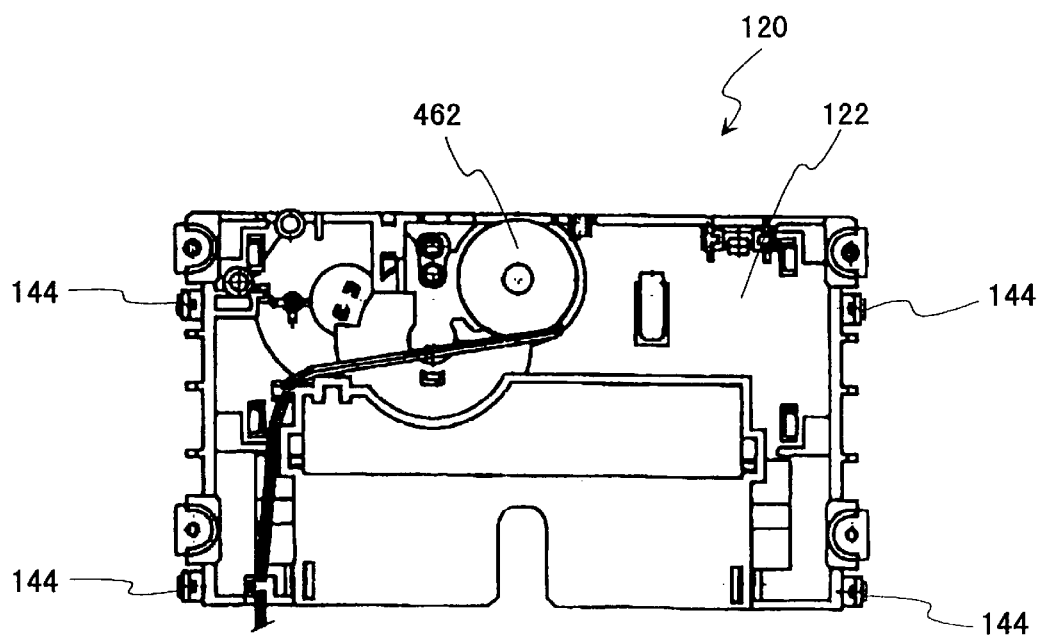

The bottom cover 380 is formed from a substantially rectangular metal plate. As shown in FIGS. 4 and 5(a), in each of the right and left edges of the front part of the bottom cover 380 (upper side in FIG. 5(a)), there are formed two bent portions each having an engaged hole 384 which is to be engaged with an engaging protrusion 144 (see FIG. 13) provided on the loading chassis 120 as described later in detail.

Further, as shown in FIGS. 8(a) and (b), in the left and right side portions of the rear part of the bottom cover 380, there are formed two mounting portions; 386 for mounting feed chassis supporting members 400L and 400R, respectively. These feed chassis supporting members 400L and 400R are used to pivotally support the feed chassis 220 as described later.

Furthermore, as shown in FIG. 5(a), on the rear part of the bottom cover 380, two circuit board mounting portions 388 are provided. Each of the circuit board mounting portions 388 is formed into a semi-spherical shape upwardly protruded from the upper surface of the bottom cover 380. These circuit board mounting portions 388 are arranged in positions located on one of the diagonal lines of the main circuit board 200, so that the main circuit board 200 is fixedly mounted to the bottom cover 380 through a predetermined space between the upper surface of the bottom cover 380 and the under surface of the main circuit board. Further, when the main circuit board 200 is mounted on the circuit board mounting portions 388, 388, ground terminals (not shown in the drawings) of the main circuit board 200 are electrically connected thereto, thereby enabling to reduce noise generated in the main circuit board 200. Moreover, not shown in the drawings, heat dissipation sheets are provided between the under surface of the main circuit board 200 and the bottom cover 380 at positions where heat generating electrical parts such as driver ICs are mounted so that heat generated in the electrical parts is transmitted to the casing 360 through the heat dissipation sheets to achieve heat dissipation.

Figure 6:
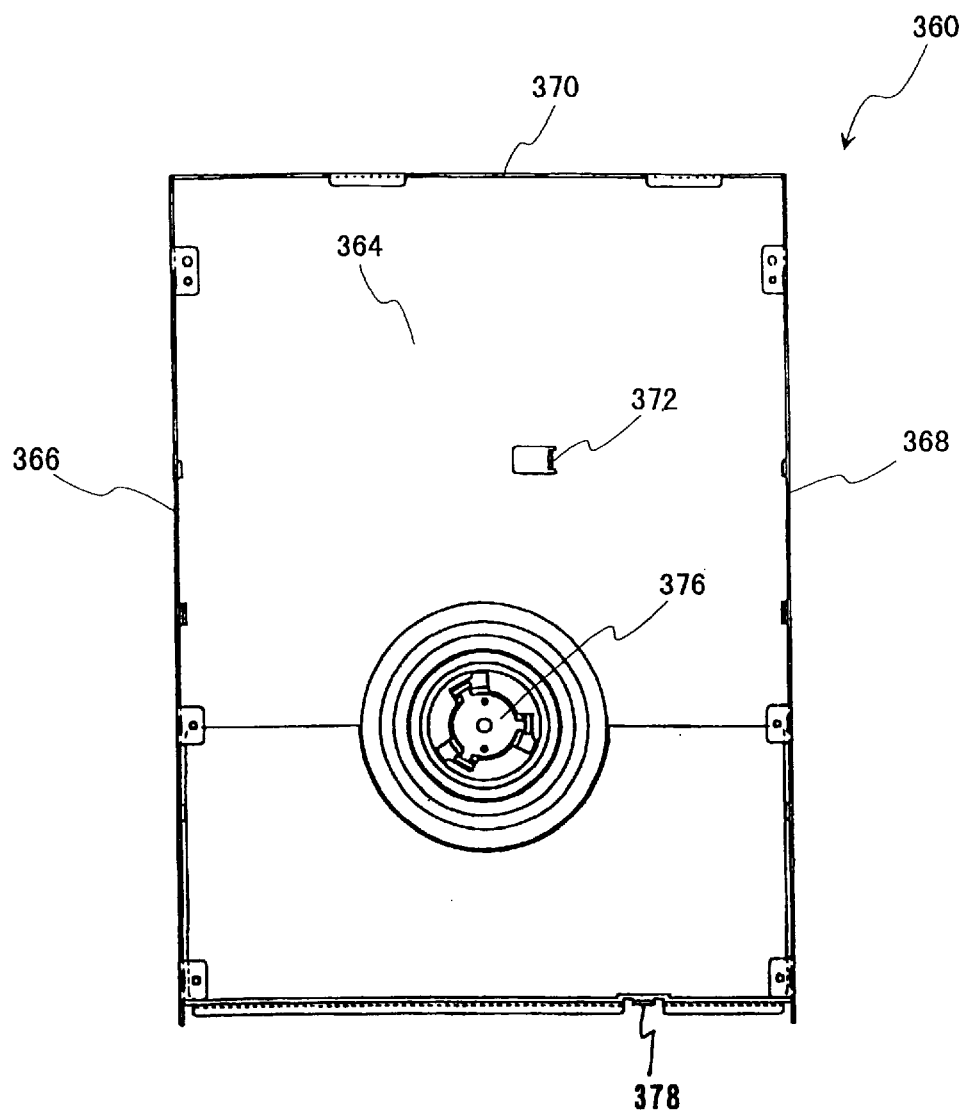
FIG. 6(a) is a bottom view of the outer cover.
FIG. 6(b) is a front view of the over cover.
Figure 6:
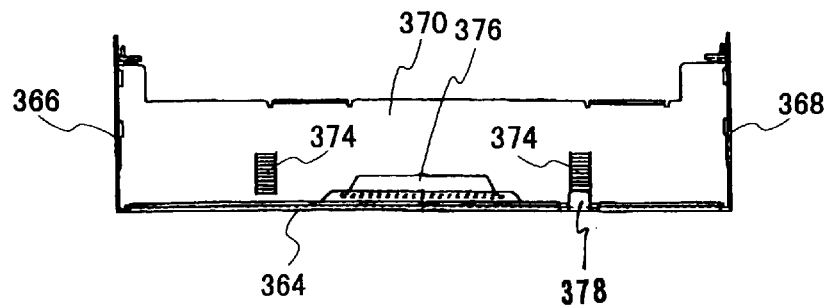

As is the same with the bottom cover 380, the outer cover 362 is also formed from a metal plate. As shown in FIG. 6, the outer cover 362 is defined by four plates which include a top plate 364, a right side plate 366, a left side plate 368 and a rear plate 374.

A disc damper 376 is rotatably provided on the under surface (inner surface) of the top plate 364 of the outer cover 362. The disc damper 376 is adapted to be attracted by a permanent magnet provided in the turntable 280 (which will be described later with reference to FIG. 18(a)) to clamp the disc 100 between the disc damper 376 and the turntable 280. After clamping the disc 100, the disc damper 376 is rotated about the same rotation axis as that of the rotation axis 242 of the turntable 280.

Figure 7:
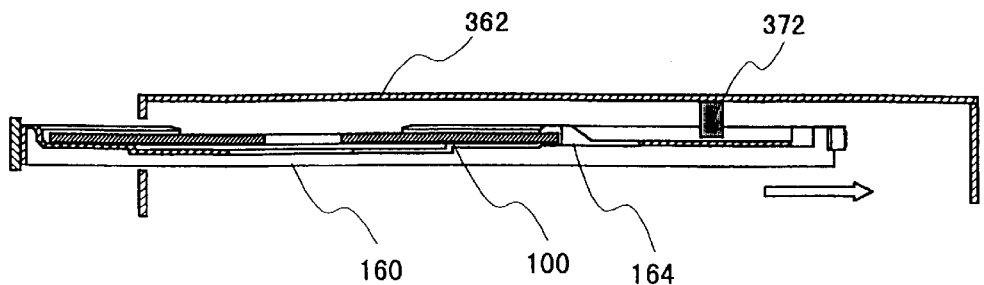
Figure 7:
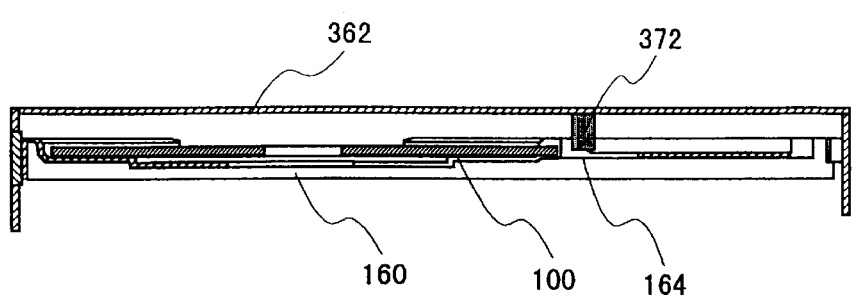
Figure 7:
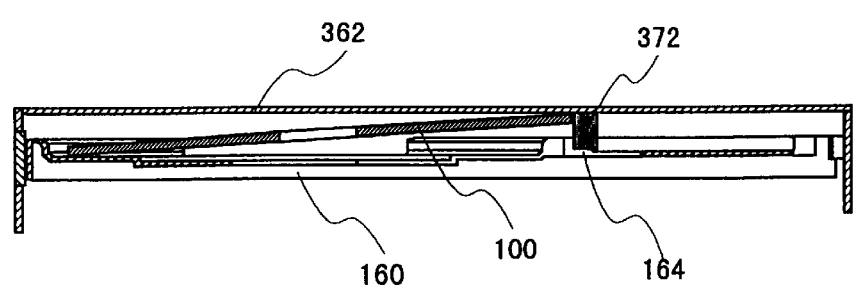
Figure 7:
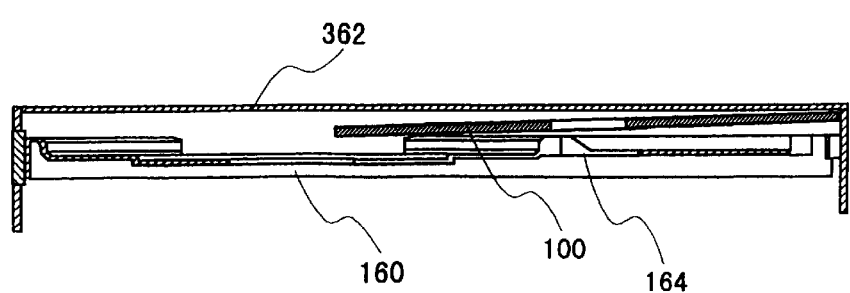

As shown in FIG. 6(a) and FIG. 7, a disc stopper 372 is provided on the under surface of the top plate 364 at a position rearward from the position of the disc damper 376. The disc stopper 372 is formed by cutting a part of the top plate 364 into a U-shape, and then bending the U-shaped portion inwardly toward the disc placing portion 162 of the disc tray 160. Specifically, this disc stopper 372 is formed into a projection protruded from the under surface of the top plate 364 perpendicularly to a position above an opening 164 in the disc tray 160 described above and slightly far from the outer periphery of the disc 100 when the disc tray 160 reaches at the disc reproducing position, as shown in FIG. 7(b). In this regard, it is to be noted that the disc stopper 372 is arranged so as not to disturb the movement of the disc tray 160 as shown in FIG. 7(a) and FIG. 7(b).

The purpose of the provision of the disc stopper 372 is as follows. Namely, personal computers of a desktop type equipped with such disc drives are normally placed in a horizontal state in which the rotation axis 100 of the disc is directed to a vertical direction. However, depending on practical situations, there is a case that such personal computers are placed in a vertical state in which the rotation axis of the disc 100 is directed to a horizontal direction. When personal computers are used by being placed in such a vertical state, there arises a case that the disc 100 which is still being rotated after having been unclamped from the disc clamper 376 is displaced or removed from the disc placing portion 162 of the disc tray 160, and then the removed disc 100 is rolling on inside the casing 360 to a back side of the casing 360 as shown in FIG. 7(d). If such an accident would be happened, the disc 100 is being left with in the casing 360 when the disc tray 160 is ejected.

The disc stopper 372 is provided for preventing such accident from being happed. Namely, according to the structure of this embodiment, even if the disc 100 is displaced or removed from the disc supporting portion 162 of the disc tray 160, the outer periphery of the removed disc 100 comes to abutment with the disc stopper 372 as shown in FIG. 7(c), thereby preventing the disc 100 from rolling on beyond the stopper 372. In this way, it is possible to prevent the disc 100 from being left within the casing of the disc drive 1A even in the case where the disc 100 is displaced or removed from the disc placing portion 162 of the disc tray 160.

In this invention, the disc stopper 372 is not provided on the disc tray 160 but on the outer cover 362 as described above. This arrangement makes it possible to prevent such an accident as described above from being caused with a simple mechanism. In this connection, it is to be noted that the present invention is not limited to the arrangement described above. In the present invention, the disc stopper 372 may be formed from a different part which is separate from the outer cover 362. Further, the disc stopper 372 may be provided on a portion other than the top plate 364 of the outer cover 362.

Further, on the under surface of the top plate 364 of the outer cover 362, there is also provided a protrusion 378. This protrusion 378 comes to abutment with a disc tray eject position regulating means 172 (see FIG. 15) formed on the disc tray 160 when the disc tray 160 reaches at the disc eject position shown in FIG. 3 and FIG. 4(a), thereby regulating the ejecting position of the disc tray 160.

Figure 17:
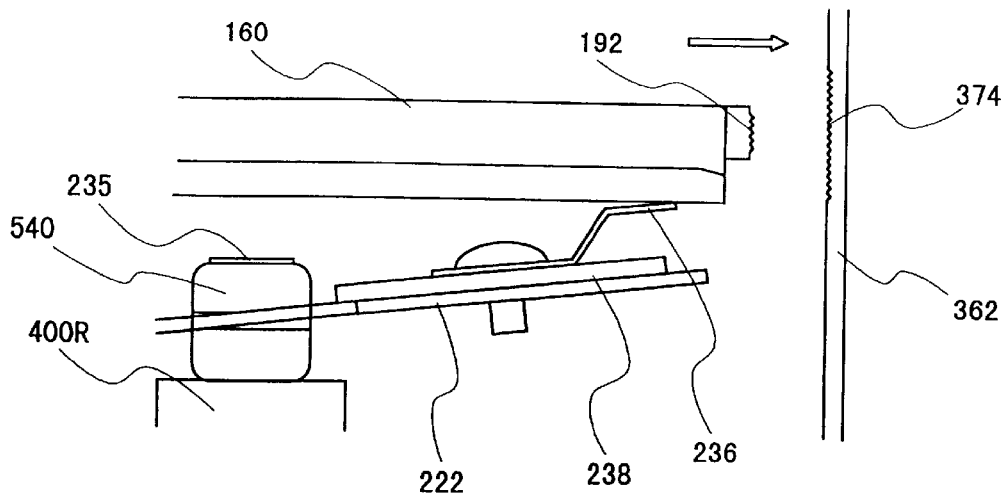
Figure 17:
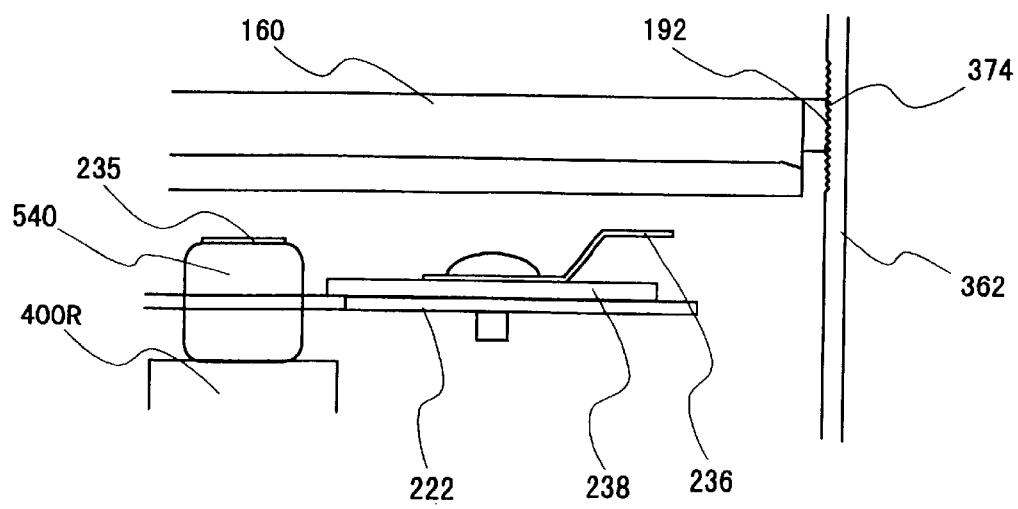

Furthermore, on the inner surface of the rear plate 370 of the outer cover 362, a pair of engaged portions 374 are formed. These engaged portions are adapted to engage with engaging portions 192 formed on the rear end part of the disc tray 160 (described later in detail) to support and position the rear end part of the disc tray 160 with respect to the casing 360 as shown in FIG. 6(b) and FIG. 17. In the present invention, the engaged portions 374 may be constructed from separate parts from the outer cover 623 and then attaching them onto the inner surface of the rear plate 362.

The front bezel 390 is formed of a resin material, and is provided with an eject button 392 for ejecting the disc tray 160 and an aperture 394 for inserting a pin-shaped member for operating an emergency ejection mechanism described later. Further, in the front bezel 390, there is formed an opening 396 through which the disc tray 160 is moved between the disc eject position and the disc reproducing position. This opening 396 is adapted to be closed by a disc tray cover 298 integrally formed on the front part of the disc tray 160.

Figure 8:
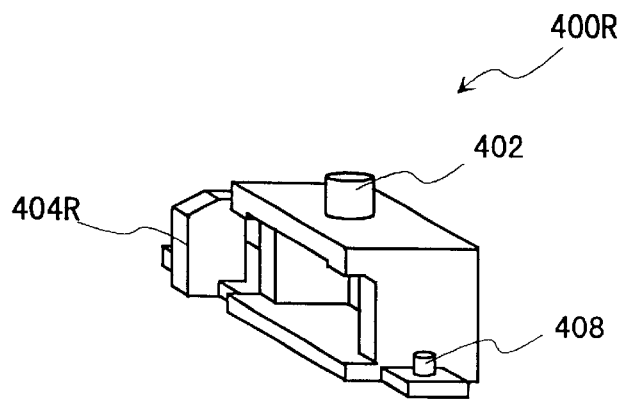
FIG. 8(a) is an exploded perspective view of the right side chassis supporting member and a mounting portion thereof provided on a part of the bottom cover.
FIG. 8(b) is an exploded perspective view of the left side chassis supporting member and a mounting portion thereof.
Figure 8:
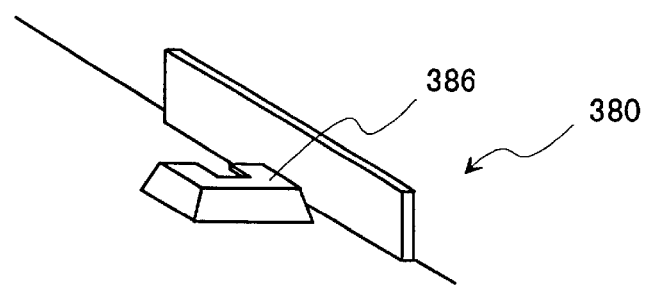
Figure 8:
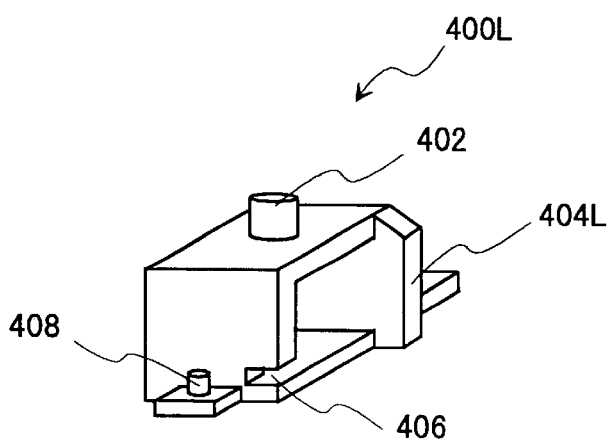
Figure 8:
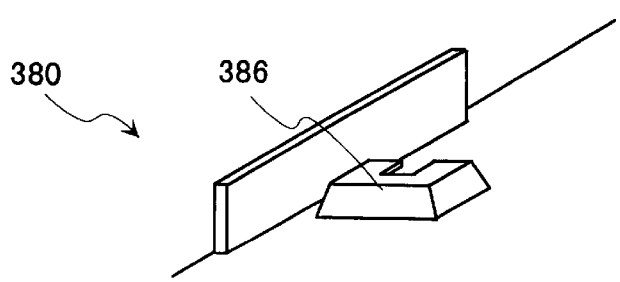

On the left and right sides of the rear part of the bottom cover 380, there are provided a pair of feed chassis supporting members 400R and 400L which support the opposite sides of the feed chassis 200 as shown in FIG. 5(a) and FIG. 8. These feed chassis supporting members 400R and 400L are respectively formed of a hard resin material or the like. As shown in FIG. 8, on the upper surface of each of the feed chassis supporting members 400R and 400L, there is provided a vertical protrusion 402 for mounting the feed chassis 220 through an elastic member (insulator) 540 described later.

Figure 5:
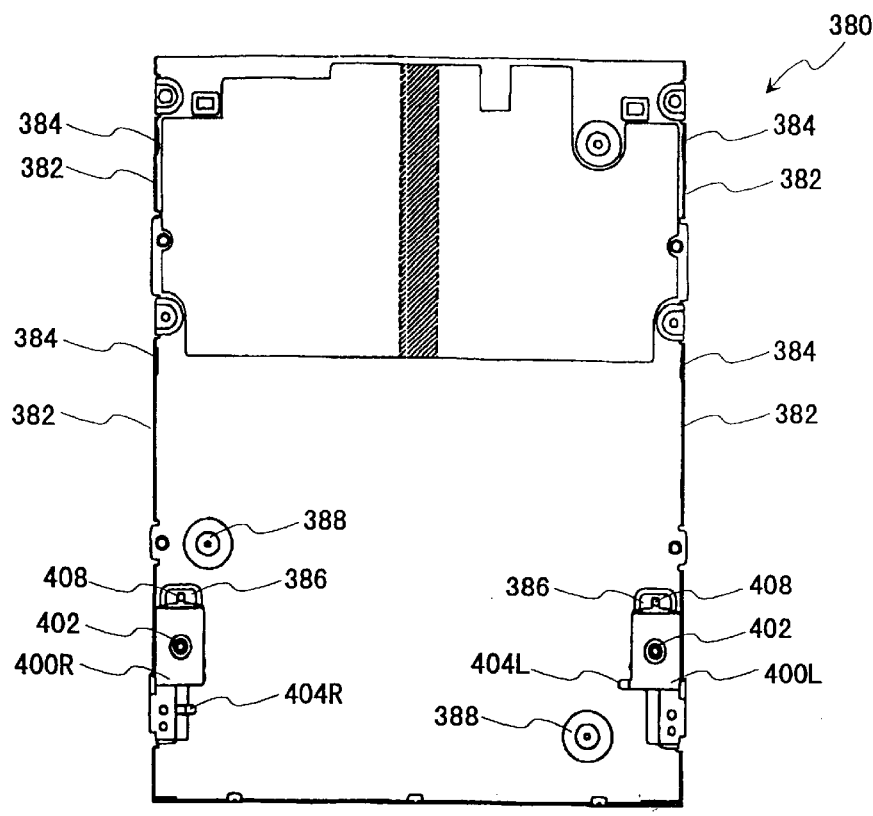
FIG. 5(a) is a top plan view of a bottom cover of the casing on which feed chassis supporting members are mounted.
FIG. 5(b) is a rear view of the bottom cover on which the feed chassis supporting members are mounted.
FIG. 5(c) is a front view of the left side feed chassis supporting member 400L.
Figure 5:
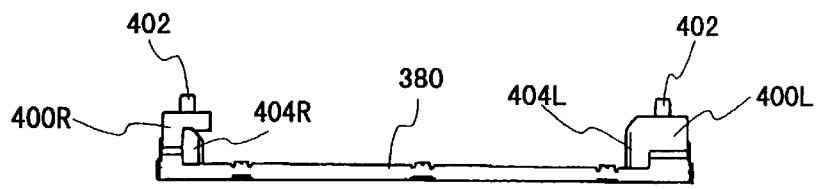
Figure 5:
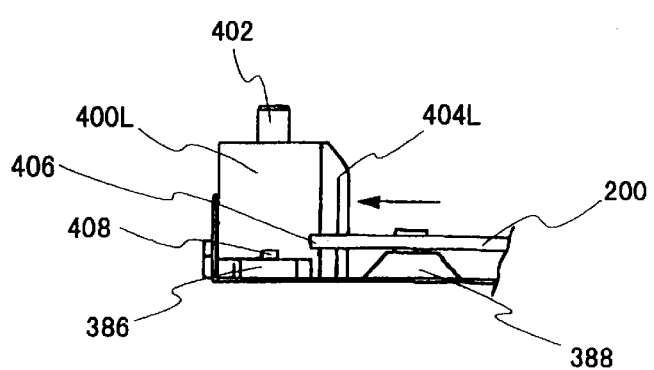

As shown in FIG. 5 and FIG. 8(a), the right side feed chassis supporting member 400R is formed with a guide rib 404R which is adapted to engage with a guide recess 202R formed in the main circuit board 200 for guiding the main circuit board 200 when the main circuit board 200 is to be mounted.

Further, as shown in FIG. 5 and FIG. 8(b), the left side feed chassis supporting member 400L is formed with a guide rib 404L which is adapted to engage with a guide recess 202L formed in the main circuit board 200 for guiding the main circuit board 200. Further, the feed chassis supporting member 400L is formed with an engaging recess 406 to which a part of the left edge of the main circuit board 200 is to be fitted, thereby supporting and fixing the main circuit board 200.

Furthermore, as shown in FIG. 5(a) and FIGS. 8(a) and 8(b), each of the feed chassis supporting members 400R and 400L is provided with an engagement protrusion 408 which is adapted to engage with each mounting portion 386 formed on the bottom cover 380 for mounting the feed chassis supporting members 400R and 400L onto the bottom cover 380.

Figure 9:
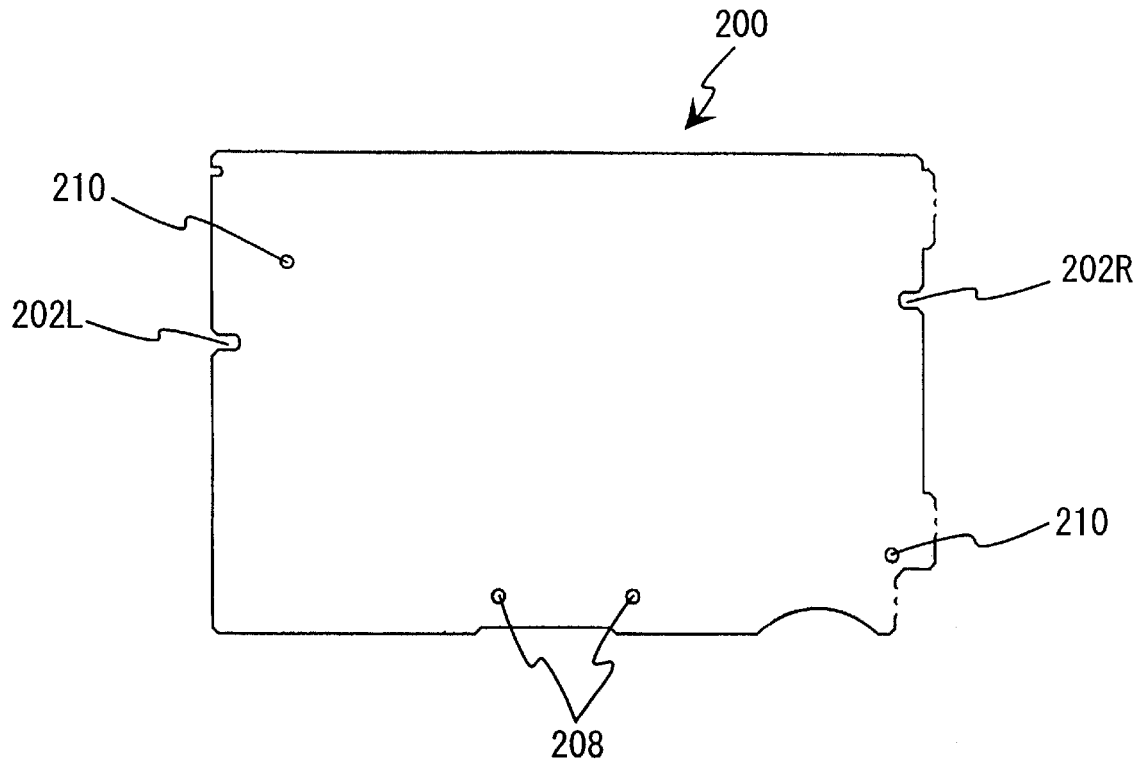
FIG. 9 is a top plan view of a main circuit board.

The main circuit board 200 is formed into a double sided circuit board having a roughly rectangular shape as shown in FIGS. 2 and 9. Though not specifically shown in the drawings, on the main circuit board 200, an interface connector for connection with a mother board of a computer, various types of ICs such as a microprocessor, memories and a motor driver, and various electric or electronic parts such as registers, capacitors and switches are mounted. They are used to drive and control a spindle motor 240, a loading motor 462, a sled motor 300 and an optical pick-up and the like.

A heat generating type IC such as the motor driver IC described above is arranged on the under surface of the main circuit board 200 since heat is generated therefrom. In this embodiment, the heat is transmitted to the casing 360 for dissipation through the heat dissipation sheet attached to the bottom cover 380 as described above.

Further, the shape and size of the main circuit board 200 is designed so that it is arranged within a roughly rear-half part of the bottom cover 380. Due to this arrangement, the main circuit board 200 is located at a position far from the front bezel 390. Therefore, in this disc drive, another small printed circuit board (operation switch circuit board) for operation switches such as an eject button 392 is additionally provided in the vicinity of the front bezel 390, and this operation switch circuit board 420 is connected to the main circuit board 200 through an FFC (flexible flat cable) 430.

Figure 10:
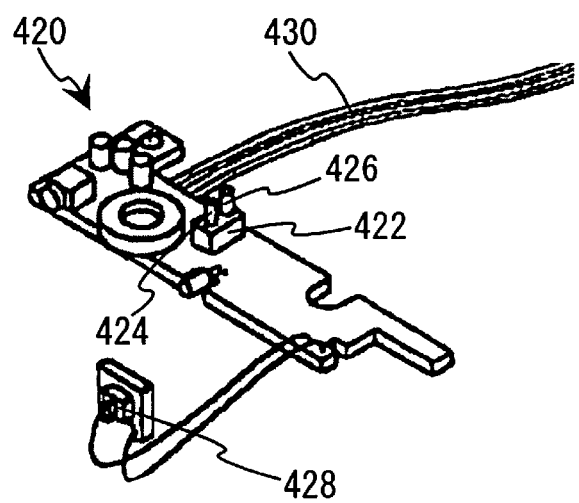
FIG. 10 is a perspective view of an operation switch circuit board.

As shown in FIG. 10, on the operation switch circuit board 420, a switch 422 for detecting a state of the disc tray, that is for judging whether or not the disc tray 160 is in the opening state (eject position) or in the closing state (reproducing position), and an eject switch operatively connected to the eject button 392 for ejecting the disc tray 160. The disc tray state detecting switch 422 includes an opening state detecting switch 424 and a closing state detecting switch 426.

Further, as stated in the above, in the main circuit board 200, the guide recesses 202R and 202L are formed at the opposite left and right edges thereof, respectively, and these guide recesses are adapted to receive the guide ribs 404R and 404L provided in the feed chassis supporting members 400R, 400L, respectively. In addition, in the main circuit board 200, there are formed two fitting holes 208 for mounting a FFC holder 440 to the main circuit board 200 (described later), and two through holes for mounting the main circuit board 200 to the circuit board mounting portions 388 of the bottom cover 210 with screws.

As shown in FIG. 2, an FFC 204 is connected between the optical pick-up 250 and the main circuit board 200 for transmission and reception of various signals. As shown in FIG. 11(a), one end of the FFC 204 is soldered to the upper surface of the main circuit board 200 at the side of the loading chassis 120 so as to extend toward the loading chassis 120. The FFC 204 is then turned back at the vicinity of the edge of the main circuit board 200 as shown in FIGS. 11(a) and 11(b), and connected to the optical pick-up 250 at the other end thereof.

In this embodiment, in order to prevent the turned back part of the FFC 204 from obstructing the movement of the optical pick-up 250, the turned back part of the FFC is secured to the main circuit board 200 through an FFC holder 440, as shown in FIGS. 11(a) and 11(b).

Figure 11:
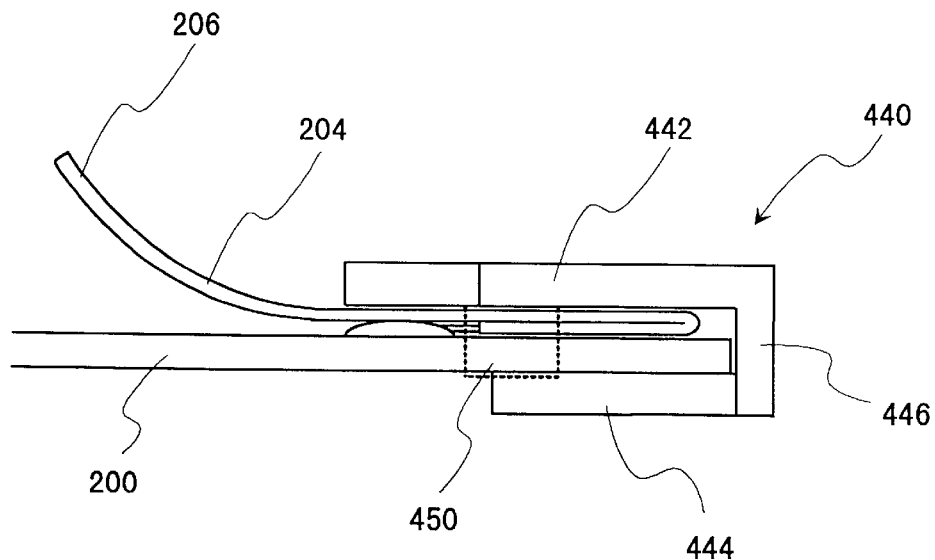
FIG. 11(a) is a side view which shows the state that FFC connected to the main circuit board is; secured onto the main circuit board by an FFC holder.
FIG. 11(b) is a perspective view of that state.
Figure 11:
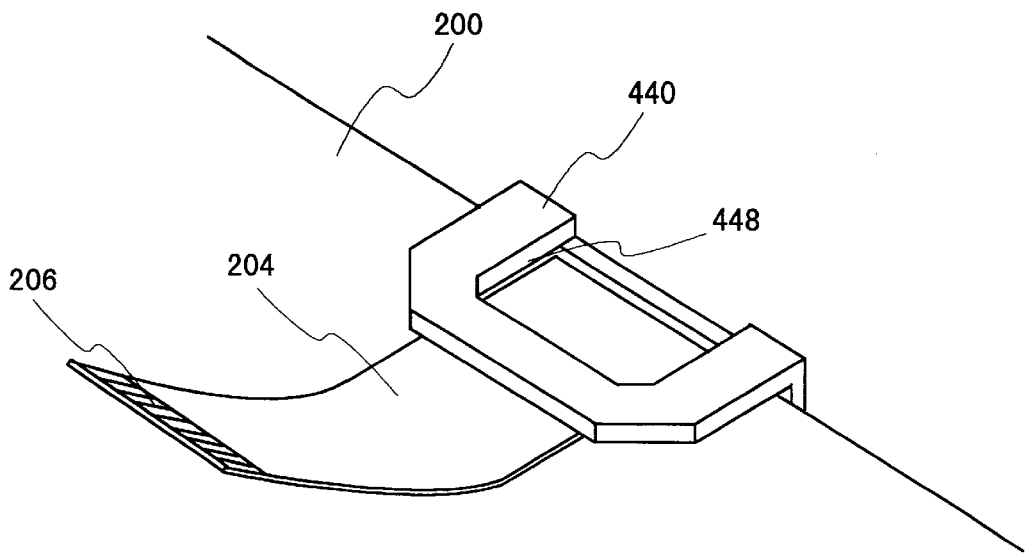
Figure 12:
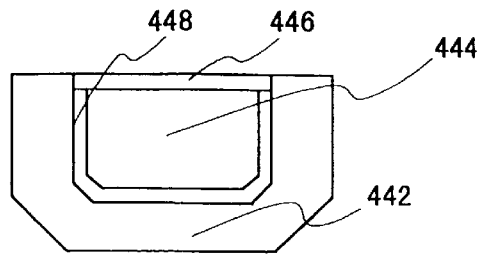
FIGS. 12(a) to (e) are respectively a top plan view, a front view, a rear view, a side view and a bottom view of the FFC holder.
Figure 12:
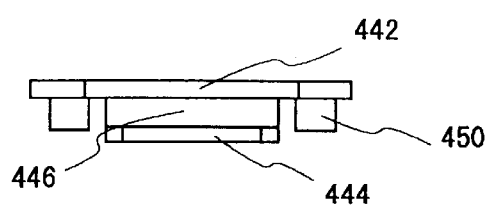
Figure 12:
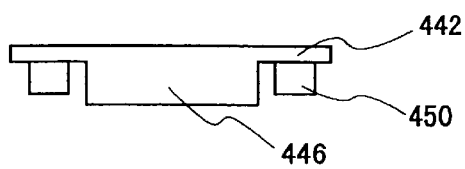
Figure 12:
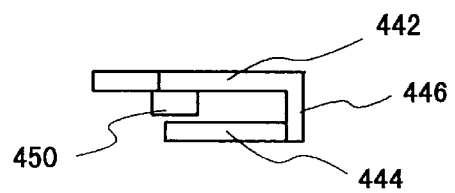
Figure 12:
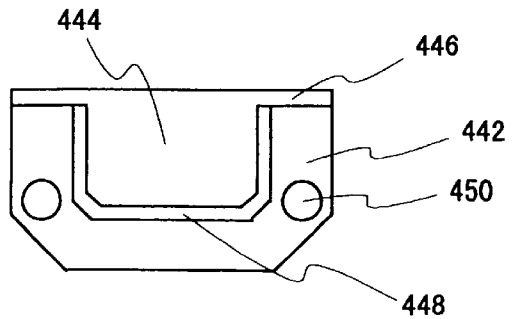

As shown in FIGS. 11 and 12, the FFC holder 440 includes an upper part 442 which is to be abutted onto the upper surface of the main circuit board 200, a lower part 444 which is abutted onto the lower surface thereof, and a connecting part 446 connecting the upper part 442 and the lower part 444. The FFC holder having these parts is integrally formed of a resin material.

In the upper part 442 of the FFC holder 440, there is formed an opening 448 of which width is substantially the same as the width of the FFC 204 as shown in FIG. 11(b). This opening 448 is provided for preventing the turned back part of the FFC 204 from being pressed by the upper part 442 and being excessively folded so that inner conductors are broken. According to this structure, since the turned back part of the FFC 204 is positioned within the opening 448, the turned back part is not pressed by the upper part 442. Further, as shown in FIG. 12, the lower part 444 is formed into a shape substantially the same as that of the opening 448.

On the under surface of the upper part 442, there are formed two protrusions 450 which are adapted to be fitted into the fitting holes 208 for preventing the FCC holder 440 from falling off from the main circuit board 200. Namely, since the protrusions 450 are securely fitted into the fitting holes 208 and thereby the FFC holder 440 is positioned with respect to the main circuit board 200, the FFC will not be removed from the main circuit board 200 even when an external force is applied to the FFC holder 440.

The FFC holder 440 may be formed of other material such as metal. In such a case, it is preferred that the surface of the holder is coated with an insulating layer for preventing short in the conductors. Further, the protrusions 450 may be formed on the lower part of the FFC holder 440. In such a case, the same result as that of the case where the protrusions are provided on the upper part of the FFC holder 440 can be obtained.

The loading chassis 120 which is provided on the bottom cover 380 is formed by molding a hard resin material into a predetermined block shape. As shown in FIG. 2 and FIG. 13(a), the block is roughly constructed from a base part 122 and left and right wall portions 142, 142 provided on the opposite sides of the base part 122. In the base part 122, there are formed a pivotal frame mounting section 124 to which a pivotal frame 340 it to be mounted and a cam mechanism accommodating section in which the loading cam mechanism 460 is accommodated. In this invention, the size and shape of the loading chassis 120 is designed so that it is arranged within a roughly front-half part of the bottom cover 380. Further, when the loading chassis 120 is mounted on the bottom cover 380, it is separated from the main circuit board 200.

No wall portions are formed on the front and rear sides of the base part 122 of the loading chassis 120 such that front and rear portions of the loading chassis L20 provide open spaces. When the loading chassis 120 is assembled into the casing 360, the front portion of the loading chassis 120 is aligned with the opening 396 of the front bezel 390 attached to the casing 360 so that the disc tray 160 can be moved through the opening 396.

Figure 15:
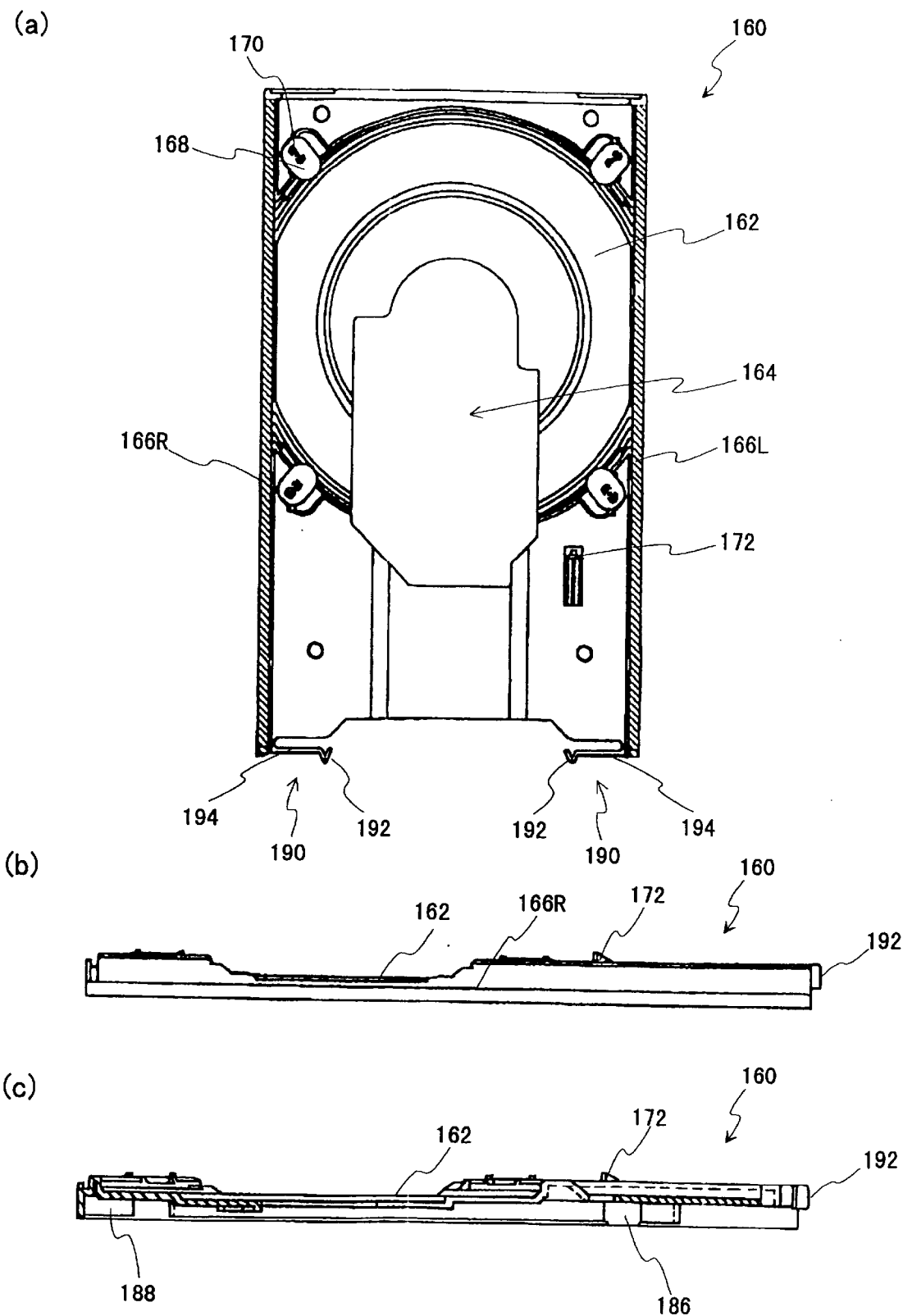
FIGS. 15(a) to 15(b) are respectively, a top plan view and a side view of the disc tray.
FIG. 15(c) is a cross-sectional view of the disc tray which is taken along line A–A' of FIG. 15(a).

Further, as shown in FIG. 13(a), on the upper surface of the base part 122 of the loading chassis 120, there are formed a pair of upper surface holding members 136 for respectively holding upper surfaces of stepped portions 166R and 166L formed on the opposite sides of the disc tray 160 (see FIG. 15). Further, there are also formed guiding protrusions 138 which are respectively slidably engaged with guide grooves 174R and 174L formed on the under surface of the disc tray 160. In addition, the base part 122 of the loading chassis 120 is also formed with apertures for switching members of the disc tray state detecting switch 422. The upper surface holding members 136 and the guiding protrusions 138 serve to guide the disc tray 160 in the forward and backward directions under the condition that the movement of the disc tray in the up and down directions with respect to the loading chassis 120 is being restricted.

As shown in FIGS. 13(a) and 13(b), on each of the right and left side wall portions 142, 142, there are provided two engaging protrusions 144, 144 which are respectively engaged with the engaged holes 384, 384 formed in the bottom cover 380 (see FIG. 4 and FIG. 5(a)). By the engagements between these four engaging protrusions 144 and the corresponding engaged holes 384, the loading chassis 120 is fixedly mounted onto the bottom cover 380.

Figure 22:
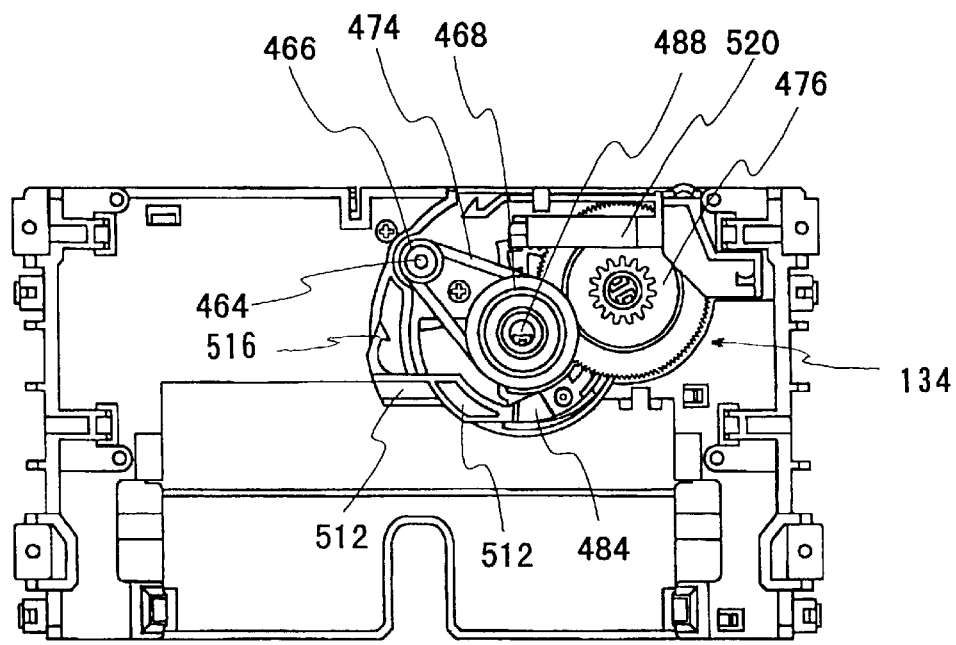
Figure 22:
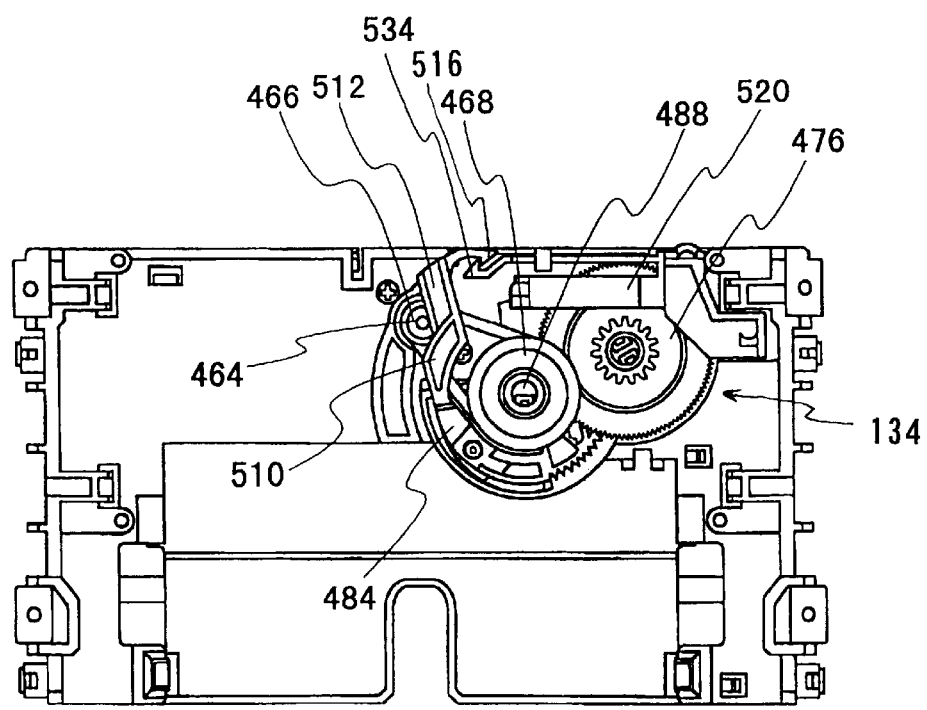

Further, as shown in FIG. 13(a), on the rear side of the base part 122 of the loading chassis 120 (that is, the side of the base part 122 that is close to the main circuit board 200), there is formed a concave portion which defines the pivotal frame mounting section 124 described above. Further, on the front inner wall 126 of the pivotal frame receiving section 124, there is formed a vertical guide groove 132 which extends vertically with respect to the bottom cover 380. In the front side of the base part 122 of the loading chassis 120 (that is, the side of the base part that is close to the front bezel 390), there is provided the loading cam mechanism accommodating section 134 for accommodating the loading cam mechanism 460 therein. As shown in FIG. 22, a cam wheel 484 of the loading cam mechanism 460 is arranged within the accommodating section 134, and a second guide pin 348 of the pivotal frame 340 (see FIG. 14) is inserted into the guide groove 132 for guiding the vertical motion of the second guide pin 348.

As shown in FIG. 13(a), on the left and right side walls 126 of the pivotal frame mounting section 124, there are formed axis supporting portions 130L and 130R for supporting the left and right axes 358L and 358R of the pivotal frame 340 (described later), respectively.

As clearly shown in FIG. 2, the pivotal frame 340 is placed within the pivotal frame mounting section 124 for pivotally displacing the feed chassis 220.

Figure 14:
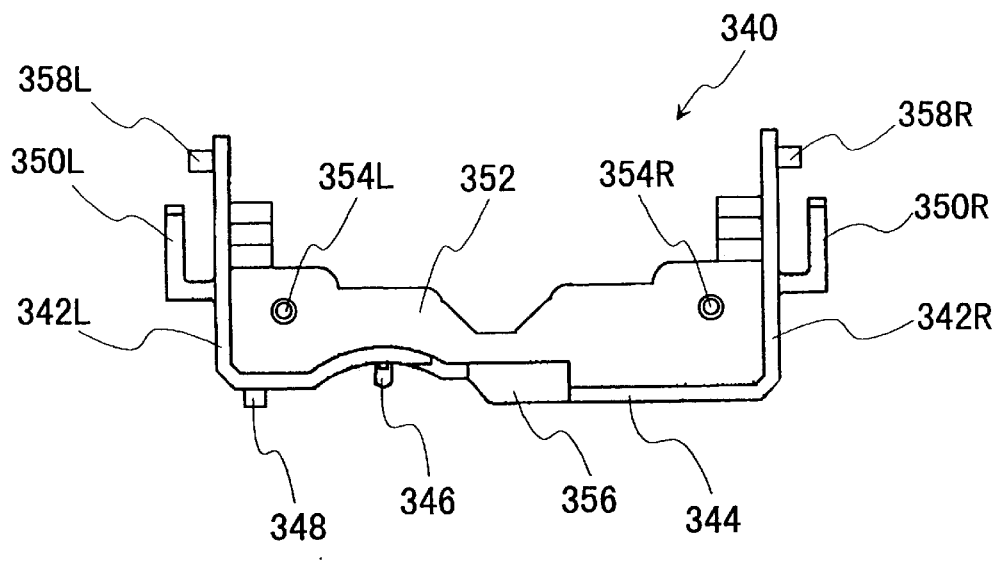
FIGS. 14(a) to 14(c) are respectively a top plan view, a front view and a left side view of a pivotal frame.
Figure 14:
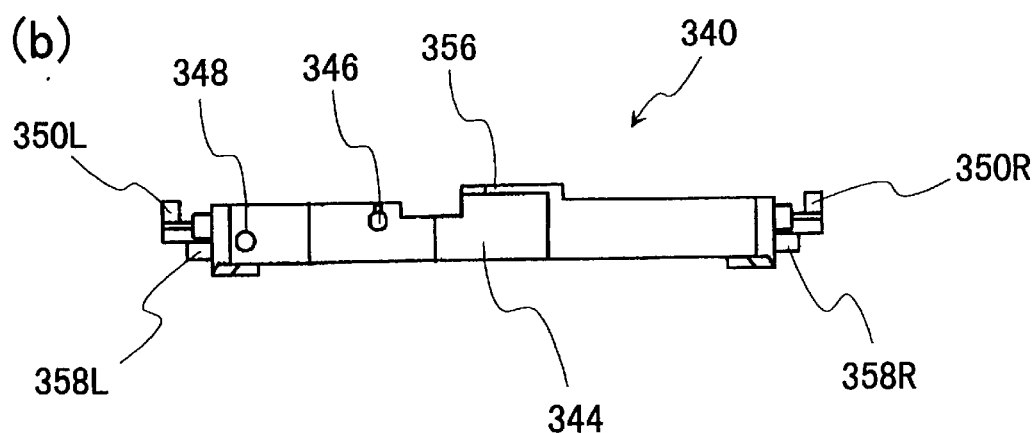
Figure 14:
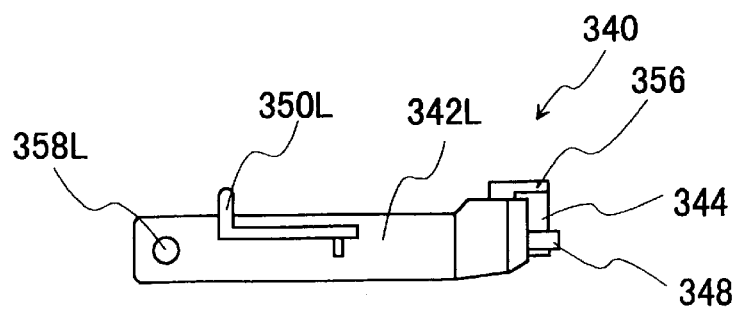

As shown in FIG. 14, the pivotal frame 340 is formed of a synthetic resin as is the same with the loading chassis 120, and it is pivotally supported via bearing portions 130R and 130L provided in the pivotal frame mounting section 124 of the loading chassis 120 (see FIG. 13(a)). When the pivotal frame 340 is pivoted, the front extending part 224 of the feed chassis 220 (described later) is pivoted between the raised position where the disc 100 is supported on the turntable 280 for reproduction thereof (see FIG. 4(b)) and the lowered position which is lower than the raised position (see FIG. 4(a)).

In more details, as shown in FIG. 14, the pivotal frame 340 is formed from a substantially C-shaped member which includes a pair of arms 342R and 342L which are positioned along the left and right side walls of the pivotal mounting section 124 of the base part 122 of the loading chassis 120, a connecting part 344 which connects the front ends of the respective arms 342R and 342L, and a feed chassis supporting part 352 which is integrally formed between the arms 342R and 342L along the connecting part 344.

Further, as shown in FIG. 14, on the front of the connecting part 344, first and second guide pins 346 and 348 and a projecting member 356 are integrally formed, and on the side surfaces of the arms 342R and 342L, a pair of push members 350R and 350L and a pair of axes 350R and 350L are integrally formed, respectively. Furthermore, on the feed chassis supporting part 352, a pair of vertical projections 354R and 354L are integrally formed.

The first guide pin 346 is in engagement with a cam groove 500 which is formed on a cam member 486 of the cam wheel 484 of the loading cam mechanism 466 provided in the loading chassis 120 (described later in detail). When the first guide pine 346 is guided by the cam wheel 484, the front portion of the pivotal frame 340 is pivotally moved in the up and down directions between a raised position and a lowered position about the axes 358R and 358L, and in accordance with the up and down movement of the pivotal frame 340, the forward part (front extending part) of the feed chassis 220 is also moved in the up and down directions.

The second guide pin 348 is in engagement with a vertical guide groove 132 (see FIG. 13(a)) formed in the inner wall 126 of the pivotal frame 124 of the loading chassis 120 for restricting the horizontal displacement of the pivotal frame 340.

Further, the projecting member 356 comes to abutment with a locking part 510 of the cam wheel 484 of the loading cam mechanism 460 when the front portion of the pivotal frame 340 is in the raised position, thereby locking the pivotal frame 340 at the raised position (see FIG. 14 and FIG. 22).

The push members 350R and 350L are provided for supporting the front portion of the disc tray 160 by pushing portions of the under surface of the disc tray 160 upwardly when the front portion of the pivotal frame 340 is in the raised position. When the push members 350R and 350L push the disc tray 160, the push members are resiliently abutted against the under surface of the disc tray 160, in which the restoring force exerted in the push members 350R and 350L are used to upwardly push and support the disc tray 160.

As described above, the axes 358R and 358L are axes about which the front portion of the pivotal frame 340 is pivotally moved in the up and down directions between the raised position and the lowered position. As shown in FIGS. 14(a) and 14(c), these axes 358R and 458L are respectively provided on the rear parts of the side surfaces of the right and left arms 342R and 342L so as to protrude therefrom. As described above, these axes 358R and 358L are respectively supported by the bearing portions 130R and 130L which are respectively formed in the opposite side walls 126 of the pivotal frame mounting section 124 of the base part 122 of the loading chassis 120 so that the pivotal frame 340 is pivotally displaced.

Figure 21:
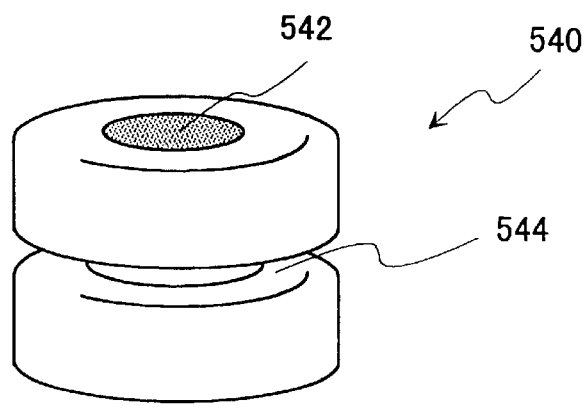
FIGS. 21(a), 21(b) and 21(c) are respectively a perspective view, a top plan view and aside view of an elastic member to be provided on the feed chassis.
Figure 21:
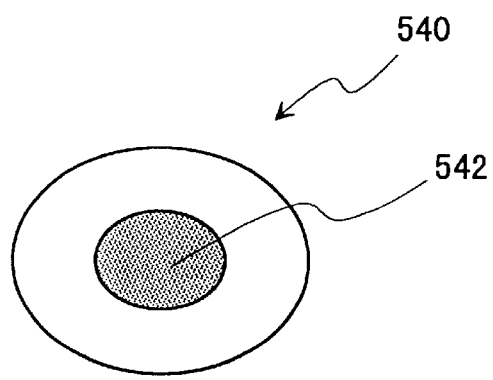
Figure 21:
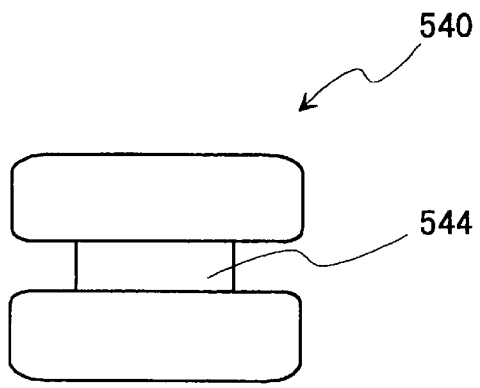

Each of the projections 354R and 354L which are provided on the feed chassis supporting part 352 has substantially the same shape as that of the projection 402 which is formed on each of the feed chassis supporting members 400R and 400L, and they are used to support the forward portion (the front extending part) of the feed chassis 220 through elastic members (insulators) 540 (see FIG. 21).

Figure 16:
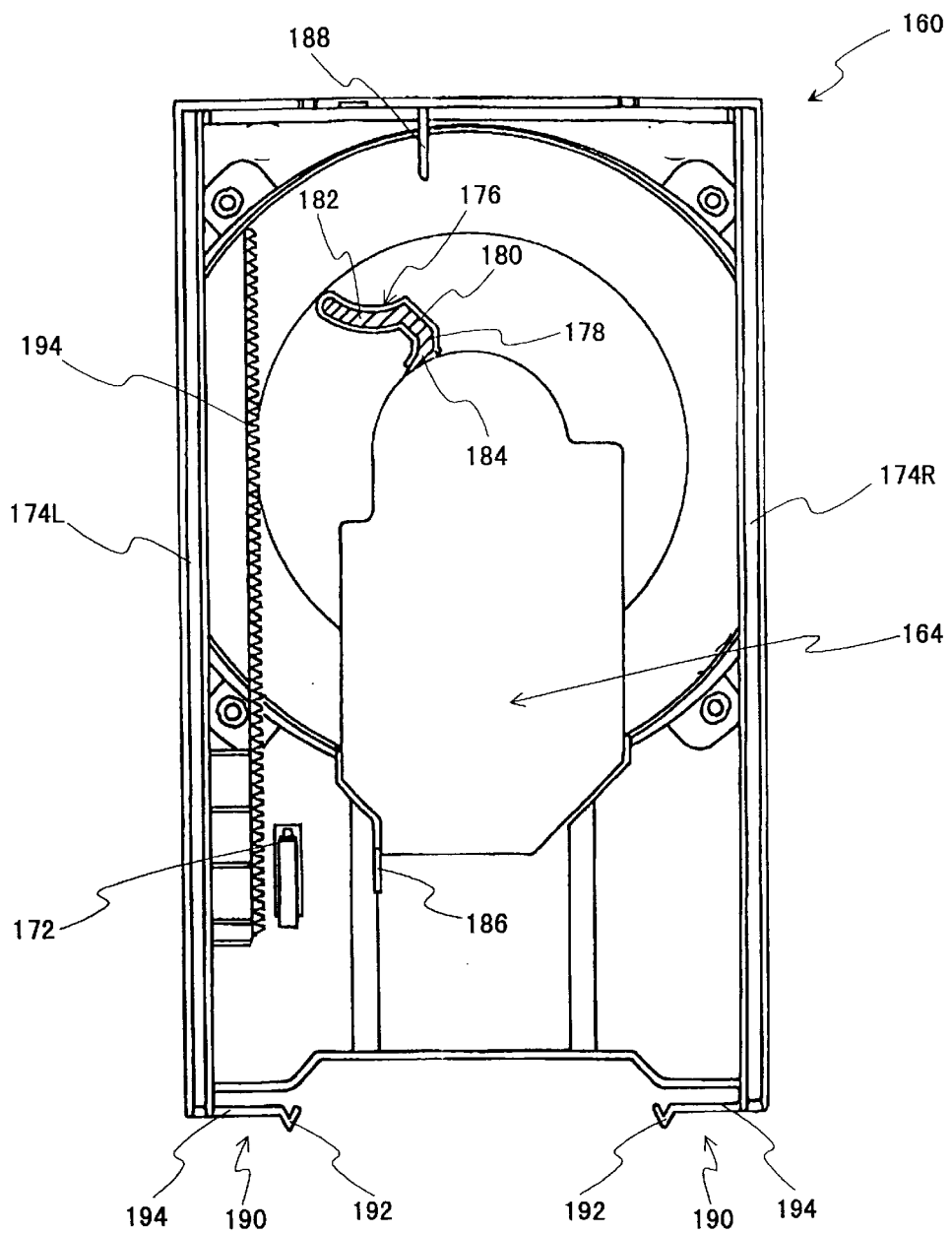
FIGS. 16(a) and 16(b) are respectively a bottom view and a rear view of the disc tray.
Figure 16:
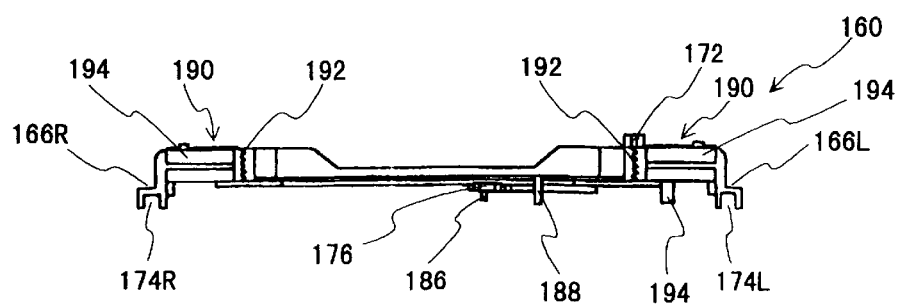

As shown in FIG. 1, FIG. 15 and FIG. 16, the disc tray 160 is formed with the disc placing portion 162 having a shallow concave shape. The disc 100 which is placed in the disc placing portion 162 is transported into the disc reproducing position within the casing 360 under the condition that it is positioned with respect to the disc tray 160.

In the disc tray 160, there is formed an opening which extends from substantially the center of the disc placing portion 162 toward the rear of the disc tray 160 so that the turntable 280 can be raised through the opening and the optical pick-up 250 can move along the radial direction of the disc 100 through the opening 164 for reproducing or reproducing and recoding the disc 100. Further, as described above, along the left and right edges of the disc tray 160, the step portions 166L and 166R are respectively formed in the front and rear directions. These step portions 166L and 166R are slidably engaged with the upper surface holding members 136L and 136R of the loading chassis 120, respectively, thereby guiding the disc tray 160 in the front and rear directions when it is moved.

Further, as shown in FIG. 15(a), at four peripheral parts of the disc placing portion 162 of the disc tray 160, disc holding members 168 are provided for preventing the disc 100 from being displaced or removed from the disc placing portion 162 when the disc drive 1A is placed in the vertical state. Each of the disc holding members 168 is made of an elastic material such as rubber and formed into a roughly elliptic shape, and one end portion 170 of the disc holding member 168 is rotatably attached to the disc tray 160. By rotating the disc holding member 168 about the end portion 170, it is possible to protrude the tip portion of the disc holding member 168 above the disc placing portion 162 or retract it from that protruding position. Namely, in this structure, by directing the tip portion of each disc holding member 168 above the disc placing portion 162, it is possible to prevent the disc 100 from being displaced or removed from the disc placing portion 162.

Further, as shown in FIG. 15(a) to (c), at the rear side of the disc placing portion 162 of the disc tray 160, there is formed a disc tray eject position regulating protrusion 172. This disc tray eject position regulating protrusion 172 comes to abutment with a projection 378 which is provided on the outer cover 362 in the vicinity of the front bezel 390 (see FIG. 6), thereby preventing a rear portion of disc tray 160 positioned rearward from the disc tray eject position regulating protrusion 172 from being ejected from the casing 360.

As shown in FIGS. 16(a) and FIG. 16(b), in the opposite sides of the under surface of the disc tray 160, there are respectively formed guide grooves 174L and 174R, respectively, so as to extend in the front and rear direction of the disc tray 160. These guide grooves 174L and 174R are slidably engaged with the guide protrusions 138 which are formed on the left and right portions of the upper surface of the loading chassis 120. Further, on the under surface of the disc tray 160, there is also formed a liner rack gear 196 which extends along the guide groove 174L in the front and rear direction.

Further, as shown in FIGS. 16(a) and (b), on the under surface of the disc tray 160 and in front of the opening 164, there is also formed a regulating groove 176 which is engaged with the regulating pin 508 of the cam wheel 484 of the loading cam mechanism 460. The regulating groove 176 includes a first regulating groove 178 which extends roughly in parallel with the rack gear 196, a second regulating groove 180 which is slant at an angle of roughly 45 degrees with respect to the first regulating groove 178 and a third regulating groove 182 which is continued from the second regulating groove 180 and extends so as to have an arched shape along with the course of the movement of the regulating pin 508 of the cam wheel 484. Further, the base end 184 of the first regulating groove 178 is formed into a roughly V-shape for easily receiving the regulating pin 508 of the cam wheel 484 and guiding it into the first regulating groove 178.

Furthermore, as shown in FIG. 15(c) and FIG. 16(b), on the rear part of the under surface of the disc tray 160, there is provided a first rib 186, and on the front part of the under surface of the disc tray 160, there is provided a second rib 188. The first rib 186 is provided for operating the disc tray opening switch 424 through a switching arm 520 described later, and the second rib is provided for disengaging a locking state of a hook 516 of the cam wheel 484 described later. These mechanisms will be described later in more detail with reference to the structure of the loading cam mechanism 460.

Moreover, as shown in FIG. 15 and FIG. 16, at the rear end of the disc tray 160, there is provided means for supporting and positioning the rear end portion of the disc tray 160 with respect to the rear plate of the casing 360. The supporting and positioning means includes engaging means elastically provided in the rear end portion of the disc tray and engaged means formed on the rear plate of the casing, wherein the engaging means comes to abutment with the engaged means with the engaging means being elastically deformed when the disc tray reaches the disc reproducing position.

The reason for provision of the supporting and positioning means is as follows. Specifically, in this disc drive, the disc tray 160 is supported and guided by the loading chassis 120 which is arranged on the roughly front-half part of the bottom cover 380. Therefore, when the disc tray 160 is in the disc reproducing position shown in FIG. 4(*b*), only the front-half part of the disc tray 160 is supported by the loading chassis 120, and therefore the rear-half part of the disc tray is not sufficiently supported. In order to solve this problem, the disc drive of the present invention is constructed such that the rear end of the disc tray 160 is supported and positioned with respect to the rear plate 370 of the outer cover 362 as described above.

The engaging means provided in the disc tray 160 includes a pair of rear end supporting portions 190 (a pair of elastic arms) which are integrally formed with the disc tray 160. That is, these elastic arms are inwardly provided at the opposite rear corners of the disc tray such that they face each other. These elastic arms 190 support and position the rear end portion of the disc tray 160 against rear plate 370 of the outer cover 362.

Each of the elastic arms 190 of the disc tray 160 includes a leaf spring shaped elastic part 194 which extends from the rear corner of the disc tray in a cantilever manner and which is flexible only in the front and rear directions, and an engaging part 192 formed on the tip part of the elastic part. The engaging part 192 is to be engaged with the engaged portion 374 formed in the rear plate 370 of the outer cover 362 to support and position the rear end of the disc tray 160 with respect to the outer cover 362. The leaf spring shaped elastic part 194 is flexible in the front and rear directions with respect to the disc tray 160 for absorbing impact when the engaged part 192 is abutted on to the engaging part 374, thereby providing reliable positioning of the engaging part 192 with respect to the engaged portion 374. In this connection, it is to be noted that the shape of the elastic part 194 is not limited to the leaf spring structure described above, and the elastic part may be formed from other spring means such as coil spring and the like.

As shown in FIGS. 17(*a*) and (*b*), the surface of each engaging part 192 is formed with a plurality of horizontal grooves. These grooves come to engagement with a plurality of mating horizontal grooves of the engaged portion 374 to support and position the rear end of the disc tray 160 with respect to the outer cover 362.

As illustrated in FIG. 2, in the rear side of the loading chassis 120, there is arranged the feed chassis 220 on which the turntable 280 which rotates the disc 100 and the optical pick-up 250 which reproduces or reproduce and record the disc 100 and the like are provided.

Figure 18:
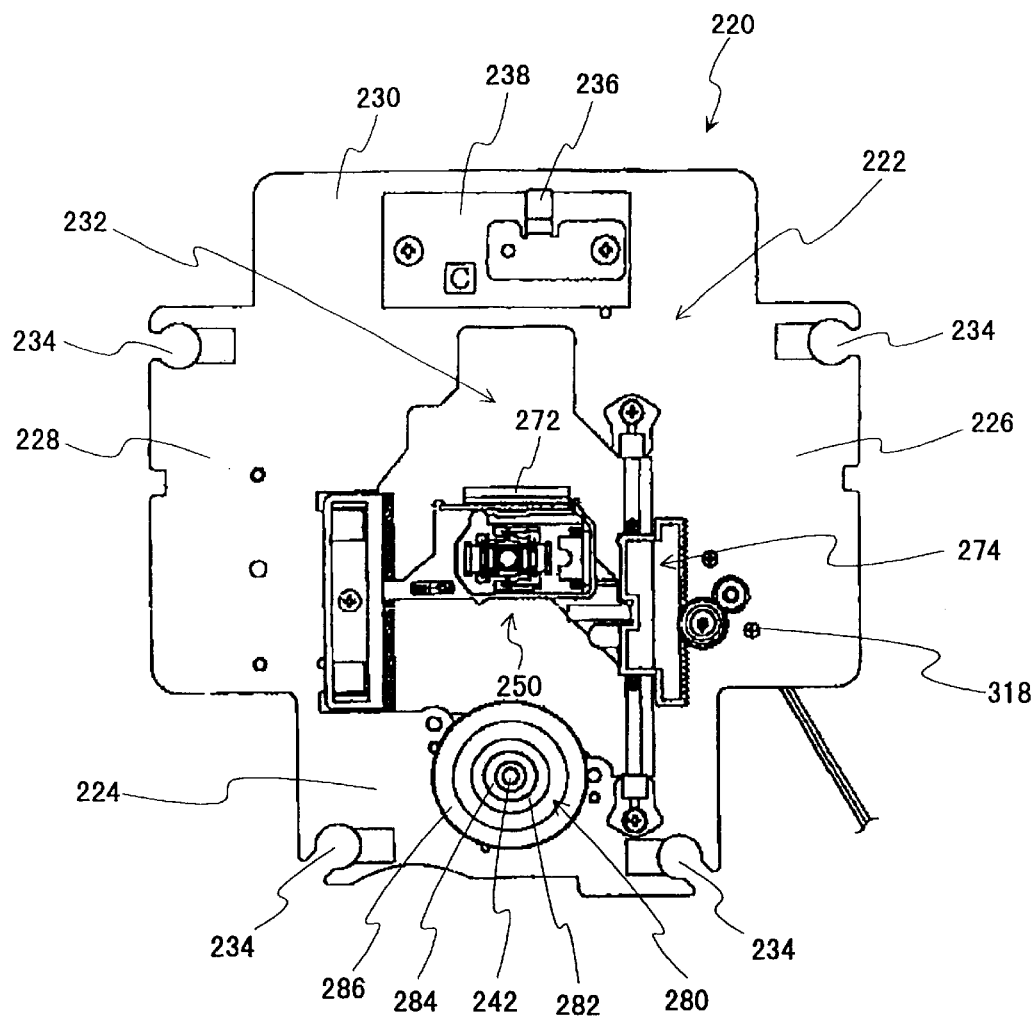
Figure 18:
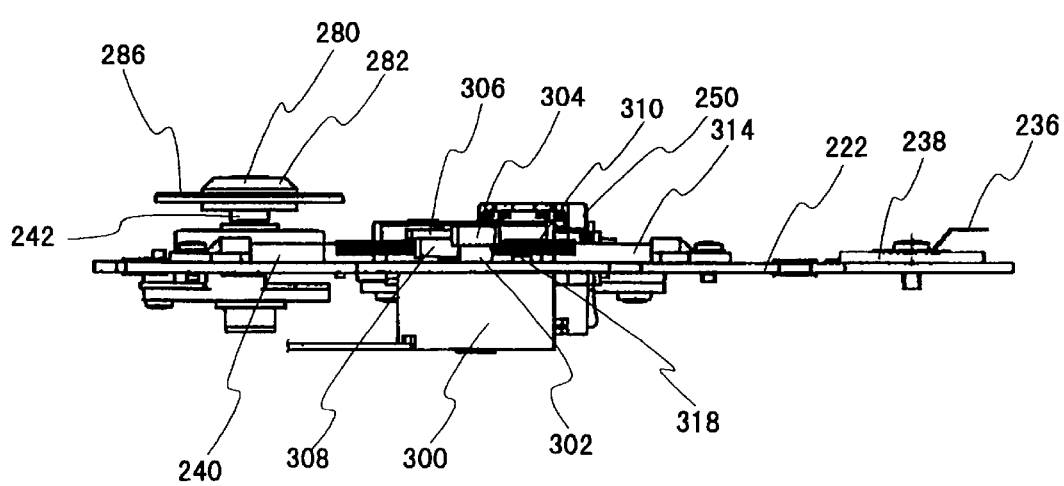
Figure 19:
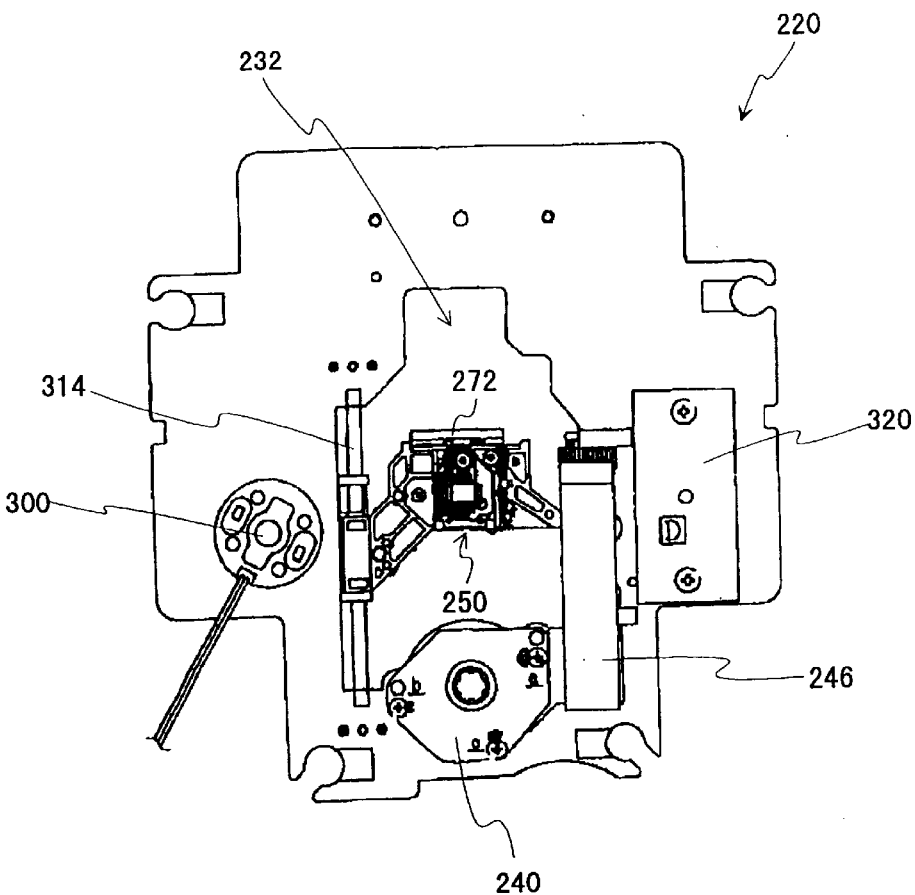
FIG. 19(a) is a bottom view of the feed chassis.
FIG. 19(b) is a top plan view of an optical pick-up moving mechanism provided in the feed chassis.
Figure 19:
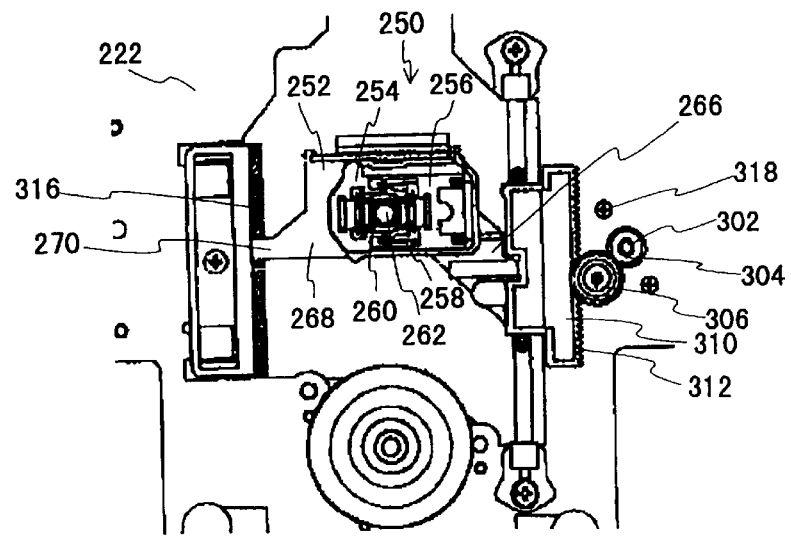

More specifically, as shown in FIG. 18 and FIG. 19, the feed chassis 220 is provided with a base plate 222 formed from a metal plate, a spindle motor 240 for rotating the turntable 280 which is fixed to the rotation axis of the spindle motor 240, the optical pick-up 250 and an optical pick-up moving mechanism 274 for moving the optical pick-up 250 in the radial direction of the optical disc 100 and the like.

As shown in FIG. 18 and FIG. 19, the base plate 222 is formed by punching the metal plate into a roughly cross shape having four extending parts which include a front extending part 224, a right extending part 226, a left extending part 228 and a rear extending part 230. Further, in the roughly central part of the base plate 222, there is formed an opening in which the optical pick-up 250 and the optical pick-up moving mechanism 274 and the like are provided.

Further, as shown in FIG. 18(*a*), the front extending part 224 of the base plate 222 is formed with two notches 234, 234 near the left and right front corners thereof. Further, each of the left extending part 228 and the right extending part 226 of the base plate 222 is also formed with a notch 234 near the rear corner thereof. These notches 234 are used for mounting elastic members 540 for absorbing the vibration of the base plate 222.

In this disc drive 1A, the maximum width in the left and right directions of the base plate 222 is substantially the same as the width of the bottom cover 370 in the left and right directions so that the right extending part 226 and the left extending part 228 are located at the rear side of the loading chassis 120. By constructing the base plate 222 in this way, the weight of the feed chassis 220 plate is increased, thereby enabling to suppress the vibration of the feed chassis 220 which would occur by the rotation of the disc 100.

The front extending part 224 of feed chassis 220 is mounted to the pivotal frame 340 by mounting the elastic members 540 attached to the notches 234, 234 to the vertical projections 354L and 354R of the pivotal frame 340 (see FIG. 14(*a*)). Further, the left extending part 228 and the right extending part 226 are respectively mounted to the protrusions 402 of the feed chassis supporting members 400R, 400L through the elastic members 540 (see FIG. 8). With this construction, the feed chassis 220 (the forward part including the front extending part 224 of the feed chassis) is pivotally displaced between the lowered position shown in FIG. 4(*a*) and the raised position shown in FIG. 4(*a*) about an axis connecting the elastic members 540 due to elastic deformation of the elastic members 540 mounted on the feed chassis supporting members 400R, 400L in accordance with the pivotal motion of the pivotal frame 340.

Further, as shown in FIG. 17 and FIG. 18, on the rear extending part 230 of the base frame 222 of the feed chassis 220, there is provided a support spring 236 which comes to abutment with the under surface of the disc tray 160 when the disc tray 160 is moved from the disc eject position toward the disc reproducing position, to support the rear part of the disc tray 160 upwardly (see FIG. 17(*a*)). Further, on the rear extending part 230 of the base plate 222 of the feed chassis 220, there is also provided a weight (metal plate) 238 for adjustment of the weight balance of the feed chassis 220.

In this connection, it is to be noted that, as shown in FIG. 17(*b*), the support spring 236 is not in abutment with the disc tray 160 when the disc tray 160 is in there producing position, since the feed chassis 220 is pivoted to the raised position where the rear extending part 230 of the feed chassis 220 is lowered. Accordingly, it is possible to prevent vibration caused in the feed chassis 220 from being transmitted to the disc tray 160.

As shown in FIG. 18(*b*) and FIG. 19(*a*), the spindle motor 240 is mounted to the under surface of the front extending part of the base plate 222 via screws such that the rotation axis 242 of the spindle motor 240 is substantially positioned at the center of the feed chassis 220 and the casing 360 in their sideways direction.

Further, as shown in FIG. 19(a), one end of an FFC is connected to the spindle motor 240, and, the other end thereof is connected to an FFC connector provided on the main circuit board 200.

The turntable 280 includes a disc shaped member, and in the center of the upper surface of the turntable 280, a center hub 282 which is to be fitted into the central opening of the disc 100 is protrudingly formed. The center hub 282 is formed into a truncated cone shape having a taper diverging from its top to the base for centering the disc 100 with respect to the turntable 280. In the center hub 282, there is provided a ring-shaped magnet 284 around the rotation axis 242 of the spindle motor 240 (see FIG. 18(a)), and the ring-shaped magnet 284 is adapted to attract the disc damper 376.

Further, as shown in FIGS. 18(a) and (b), on the upper surfaced of the turntable 280, a ring-shaped pad 286 is provided around the center hub 282. The pad 286 is preferably formed of a material having elasticity and a relatively large coefficient of friction such as rubber, soft synthetic resin and porous material. Use of such a material for the pad 286 prevents slipping from being caused when the disc 100 is rotated under the condition that it is clamped between the turntable 280 and the disc damper 376.

As described above, the feed chassis 220 is further provided with the optical pick-up 250 for reproducing or reproducing and recording the disc 100 and the optical pick-up moving mechanism 274 which is constructed into a sliding feed mechanism for moving the optical pick-up 250 in the radial direction of the disc 100.

As shown in FIG. 18(b) and FIG. 19(b), the optical pick-up moving mechanism 274 is generally comprised of a sled motor 300 which is formed from a reversible type DC-motor and is mounted to the under surface of the base plate 222, a gear A 304 which is attached to the rotation axis 302 of the sled motor 300 which protrudes vertically above the base plate 222, a gear B 306 which is in mesh with the gear A 304, a gear C 308 which is co-axially formed with the gear B 306 and has a smaller diameter than the gear B (see FIG. 18(b)), a slider 310 having a rack gear 312 which is in mesh with the gear C 308 and a guide rod bearing portion 266, a guide road 314 which passes through the guide rod bearing portion 266, and a guide rail 316 which holds, in a freely slidable manner, a protruding portion 270 of the optical pick-up 250 which is formed at a side of the pick-up opposite to the guide rod bearing portion 266 thereof. The optical pick-up 250 is provided on the slider 310, so that the optical pick-up 250 can be moved in the radial direction of the disc 100 in accordance with the movement of the slider 310. Further, the slider is slidably guided along the guide rod 314 through the guide rod bearing portion 266 thereof.

These gears A 304, gear B 306 and gear C 308 are respectively formed of a synthetic resin, and the rack gear 312 and the guide road 314 are disposed such that their longitudinal directions are oriented with the front and rear direction of the disc drive 1A.

These gears A 304, gear B 306, gear C 308 and rack gear 312 constitute a speed reduction gear mechanism of the optical pick-up moving mechanism 274 so that the rotation of the sled motor 300 is converted into the linear motion of the optical pick-up 250 with the rotation speed of the sled motor 300 being reduced. With this structure, by rotating the sled motor 300 in either one of the rotational directions, the optical pick-up 250 can be moved in the radial direction of the disc 100 along the guide road 314.

Specifically, when the sled motor 300 and the gear A 304 are rotated in the clockwise direction viewed from the upper side of the axial direction thereof, the gear C 308 is rotated in the counter-clockwise direction viewed from the upper side of the rotation axis thereof, so that the slider 310 with the rack gear 312 is moved toward the front direction (toward the turntable 280). With this result, the optical pick-up 250 moves from the outer circumferential side of the disc 100 toward the inner circumferential side thereof.

As shown in FIG. 18(b) and FIG. 19(b), the sled motor 300 is mounted on the under surface of the right extending part 226 of the base plate 222 by fastening screws 318 from the upper side of the base plate 222 into female threads formed in the casing of the sled motor 300. Namely, since the sled motor 300 is mounted on the base plate 222 only by means of the screws 318, the assembling operation of the sled motor 300 to the base plate 222 can be simplified.

On the left extending part 228 of the base plate 222 which is opposite to the right extending part 226 where the sled motor 300 is mounted, the balance weight (metal plate) 320 is provided for balancing the feed chassis 220 in its left and right direction. The size of the balance weight 320 is determined taking the weight of the sled motor 300 or the like into account.

In this connection, as described above, on the rear extending part 230 of the feed chassis 220, the balance weight 238 is provided for balancing the feed chassis 220 in its front and rear direction.

In this disc drive 1A, by providing such balance weights 238, 320, the feed chassis 220 is balanced as well as the weight of the feed chassis 220 can be increased. Thus increased weight of the feed chassis 220 makes it possible to suppress vibration which would occur in the feed chassis 220 due to rotation of the disc 100. In this connection, it is to be noted that in this disc drive 1A the common motor is used for the sled motor 300 and the loading motor 462 described later by directing the rotation axis 302 of the sled motor 300 vertically and using the balance weights 238 and 320.

By using the optical pick-up moving mechanism 274 described above, the optical pick-up 250 can be moved in the radial direction of the disc 100 along the guide road 314.

As shown in FIG. 19(b), the optical pick-up 250 is roughly composed of a pick-up base 252 which is joined to the slider 310, an actuator base 254 which is displaceably supported with respect to the pick-up base 252, a dumber base 256 integrally formed with the actuator base 254, a lens holder 260 which is supported by the dumber base 256 by means of suspension springs 258, and an objective lens 262 provided in the lens holder 260.

The pick-up base 252 is preferably formed from a hard synthetic resin material, and it includes an optical pick-up main body 264, the guide rod bearing portion 266 which is integrally formed with the slider 310 having the rack gear 312 and a guide rail engaging portion 268 having the protrusion 270 slidably engaged with the guide rail 316 described above.

As described above, the guide rod bearing portion 266 is integrally formed with the slider 310 having the rack gear 312 of the pick-up moving mechanism 274 so that the guide rod bearing portion 266 is slidably movable along the guide rod 314 in the same way as the slider 310.

Figure 20:
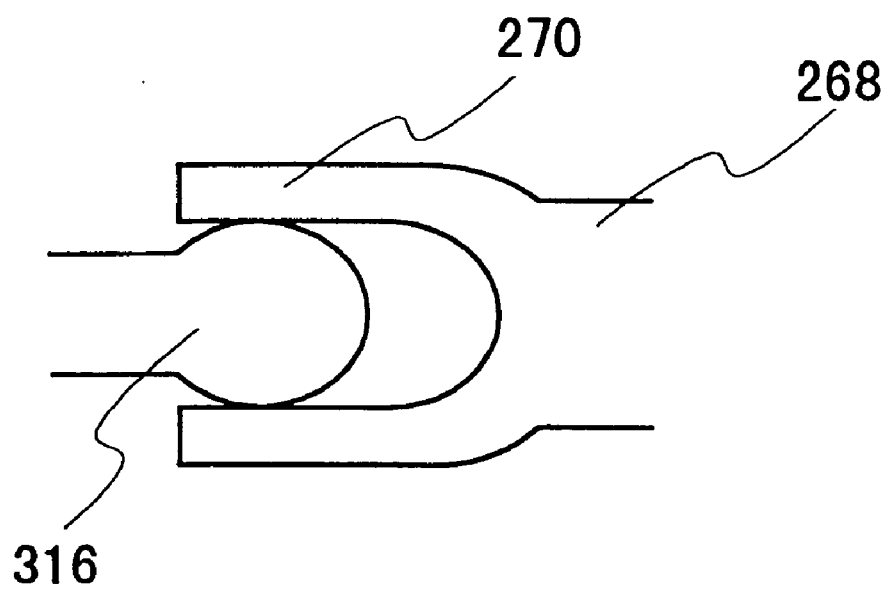
FIG. 20 is an illustration which shows a state that a guide rail engagement part of the optical pick-up is slidably engaged with a guide rail.

As shown in FIG. 20, the protrusion 270 of the guide rail engaging portion 268 is formed so as to have a roughly C-shaped configuration having an upper part and a lower part which are respectively slidably abutted onto the upper and lower surface of the guide rail 316. By this engagement of the protrusion 270 with the guide rail 316, the up and down movement of the protrusion 270 is restricted with respect to the guide rail 316 so that the horizontal posture of the optical pick-up 250 can be maintained.

The optical pick-up main body 264 is formed into a roughly box-shaped configuration for accommodating main parts of the optical pick-up 250, and it is integrally formed with the guide rod bearing portion 266 and the guide rail engaging portion 268 at the opposite ends thereof. By constructing the optical pick-up 250 in this way, the pick-up base 252 is guided by the guide rod 314 with the aid of the guide rail 316 so as to be movable only in the radial direction of the disc 100.

In this structure, only one guide rod 314 is used for guiding the optical pick-up 250, which reduces the costs of the parts and makes the assembling operation easy.

The actuator base 254 is also movable along the radial direction of the disc 100 together with the pick-up base 252 (see FIG. 19(b)). The lens holder 260 is capable of moving the tracking directions and the focusing directions by means of the suspension springs 258. Further, the lens holder 260 has a focus servo coil and a tracking servo coil for performing focusing servo control and tracking servo control of the objective lens 262 by means of these coils.

Although not shown in the drawings, the optical pick-up 250 is provided with a laser diode (LI)) for emitting a laser beam, a beam splitter for reflecting the bean from the laser diode, a mirror for directing the beam from the beam splitter toward the objective lens 262, and a photo-diode which receives the reflected beam from the disc 100 through the objective lens 262, the mirror and the beam splitter to produce electrical signals responsive to the intensities of the reflected beams.

Further, as shown in FIG. 19(b), the optical pick-up 250 is provided with an FFC connecter 272 for outputting and inputting various signals for the focusing servo and tracking servo in addition to the signals read out form the disc. The plug 206 attached to the tip of the FFC 204 which is connected to the main circuit board 200 is connected to the FFC connector 272 to supply and receive the various signals to and from the main circuit board 200. In this regard, the FFC 204 is pressed against and secured to the main circuit board 200 via the FFC holder 440 as described above so as to form a predetermined space between the pressing portion and the optical pick-up 250. This makes it possible that the FFC 204 can maintain an ideal curvature thereof irrespective of the changes in the position of the optical pick-up 250, and does not hind the motion of the optical pick-up 250.

In this disc drive 1A, the sled motor 300 of the pick-up moving mechanism 274 is controlled by a controlling means (CPU) provided on the main circuit board 200 together with the spindle motor 240 and the loading motor 426 described later.

In this case, it is preferred that the sled motor 300 is controlled so that its rotation axis 302 is being slightly oscillated by applying plus and minus pulse voltage of a predetermined cycle to the coil of the sled motor 300, thereby enabling to actuate the sled motor 300 with a low voltage at the start thereof. In other words, this does not necessitate to apply a large voltage to the motor when the motor is to be started. In particular, this is effective when the optical pick-up 250 is moved finely upon writing and reading the data to and from the disc 100. In the case of the small size motor used in the optical pick-up moving mechanism 274 of the disc drive 1A of the present invention, it is preferred that a pulse voltage of about 40 Hz is applied thereto.

Each of the elastic members 540 is formed of an elastic material such as rubber, and it is formed into a roughly cylindrical shape having an axial bore 542 as shown in FIG. 21. Further, on the outer circumferential surface of the cylindrical portion of the elastic member 540, a circumferential groove 544 is formed. The elastic member 540 is attached to each notch 234 of the feed chassis 220 by fitting the groove 544 into the notch 234. Further, each projection 354 of the pivotal frame 340 or each projection 402 of the feed chassis supporting member 400R (400L) is inserted into the axial bore 542 of the elastic member 540, respectively. In this way, the feed chassis 220 is mounted to the pivotal frame 340 and the feed chassis supporting members 400R (400L). In this regard, it is to be noted that each elastic member 540 is secured to the projection 354 or 402 by means of a screw under the condition that it is fitted to the projection.

In this construction, the feed chassis 220 (the forward portion of the feed chassis) is pivoted with respect to a pivotal axis (line) which connects the elastic members 540,540 provided on the projections 402, 402 of the feed chassis supporting members 400R and 400L.

Further, as described above, the feed chassis 220 is supported by the four elastic members 540, in which two of them support the front extending part 224 of the base plate 222 and other two of them support the rear side of each of the left and right extending parts 226, 228. This arrangement of the elastic members 540 makes it possible to prevent vibration caused by the rotation of the disc 100 from being transmitted to the loading chassis 120 and then to the casing 360. Further, this arrangement also makes it possible to prevent external vibration from being transmitted to the feed chassis 220.

In the front section of the loading chassis 120, there is provided the loading cam mechanism 460. This cam mechanism 460 functions to displace the forward portion of the feed chassis 220 between the lowered position and the raised position (see FIG. 4) as well as to move the disc tray 160 between the disc eject position and the disc reproducing position.

Figure 23:
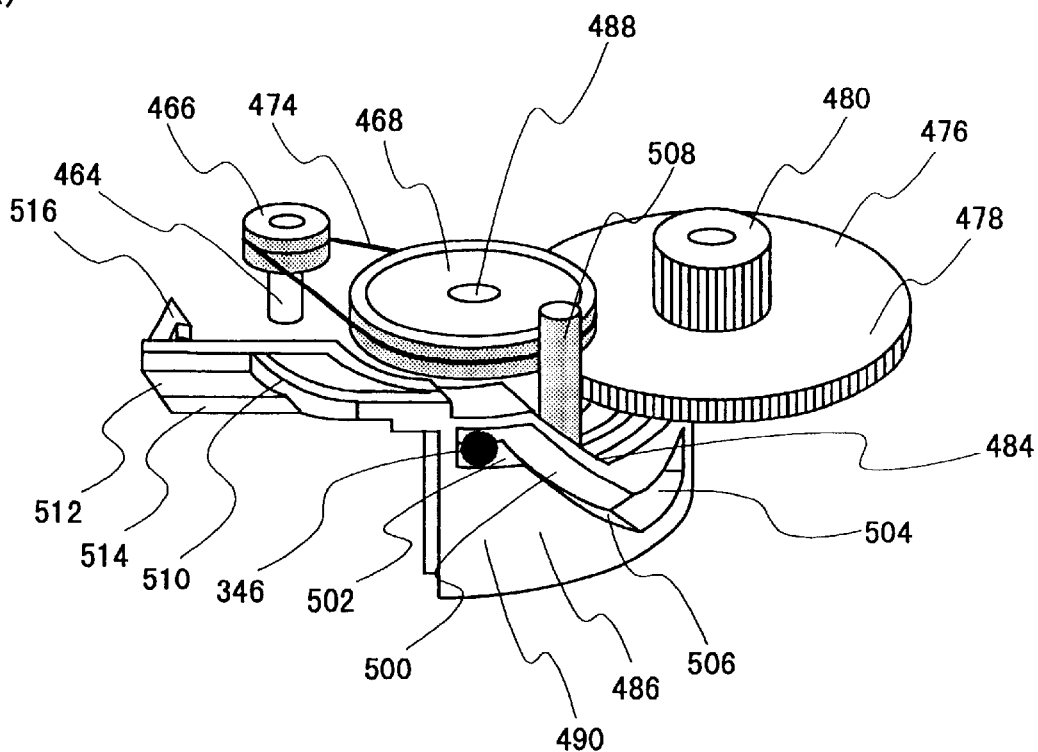
Figure 23:
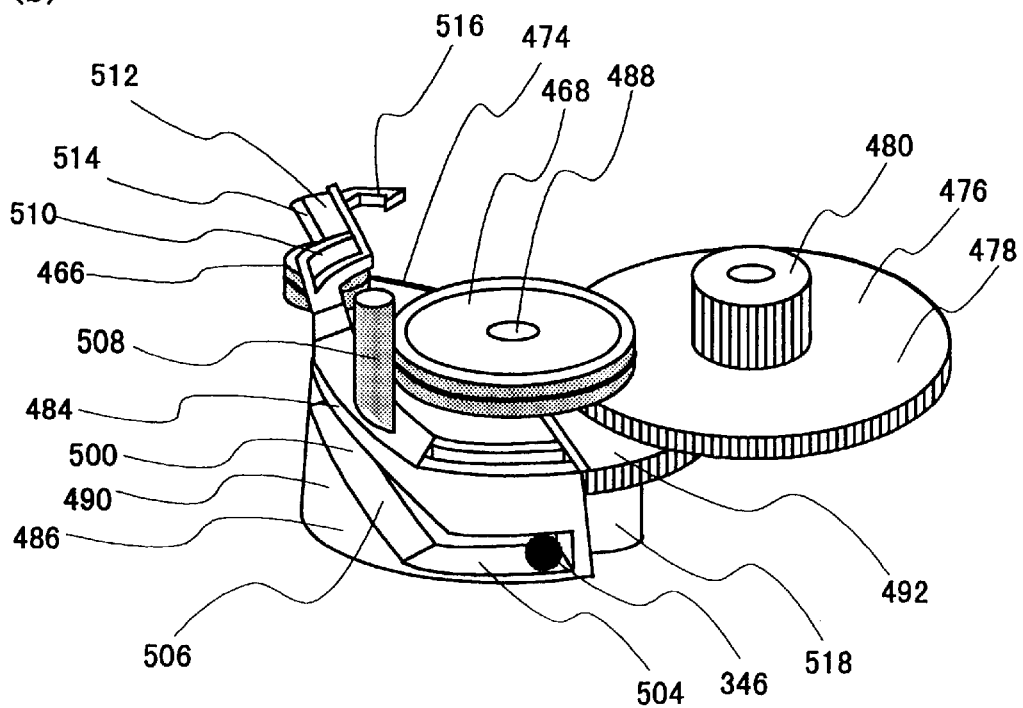

As shown in FIG. 13(b), FIG. 22 and FIG. 23, the loading cam mechanism 460 includes a loading motor 462 which is a reversible type DC motor and mounted to the under surface of the loading chassis 120, a first pulley 466 which is mounted to the rotation axis 464 of the loading motor 462, a second pulley 468 having a large diameter pulley which is rotated together with the first pulley 466 through a belt 474, a drive gear 476 for transmitting the rotation of the second pulley 468 to the disc tray 160, a cam wheel 484 which is in mesh with the drive gear 476 for pivotally actuating the pivotal frame 340, and a switching arm 520 which is adapted to be engaged with a hook 516 of the cam wheel 484 to restrict the motion of the cam wheel 484.

In this embodiment, these first and second pulleys 466, 468 and the drive gear 476 constitute a rotation speed reduction mechanism of the loading motor 462 of the loading cam mechanism 460. Further, in this embodiment, since pulleys are used in the rotation speed reduction mechanism instead of gears, it is possible to prevent foreign substances from being caught by gears. Further, it is also possible to avoid a case that excessive load is given to the loading motor 463. Such excessive load would be caused, for example, in the case where a disc which has been removed from the disc placing portion is caught by the disc tray 160 inside the casing 360.

The first pulley 466 is a small diameter pulley formed of a synthetic resin material and it is mounted to the rotation axis 464 of the loading motor 462.

Figure 24:
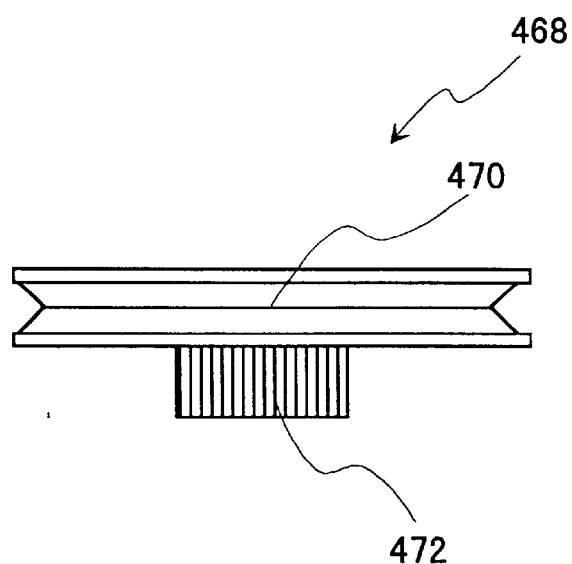
FIG. 24(a) is a side view of the second pulley used in the loading cam mechanism.
FIG. 24(b) is a side view of the drive gear used in the loading cam mechanism.
Figure 24:
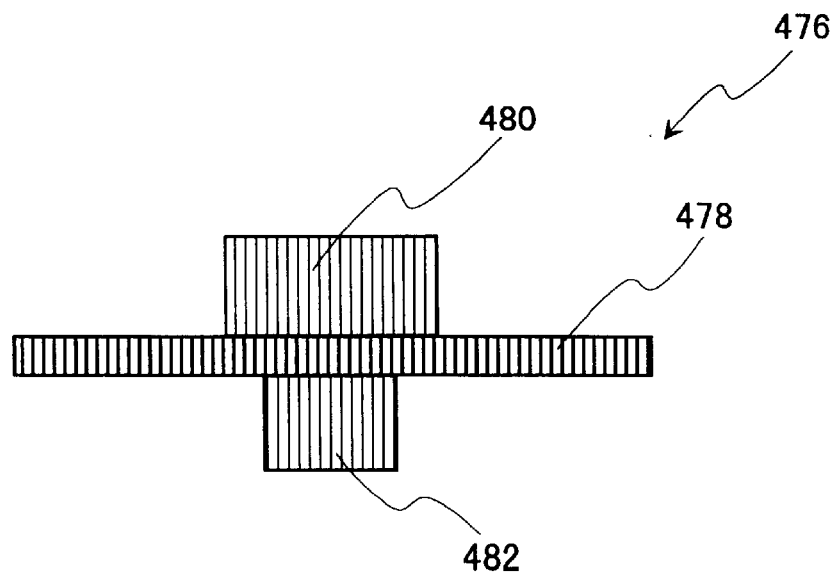

The second pulley 468 is also formed of a synthetic resin and, as shown in FIG. 24(*a*), it is constructed from a large diameter pulley portion 470 which is coupled to the first pulley 466 though the belt 474 and a gear portion 472 which is co-axially formed on the pulley portion 470.

As shown in FIG. 22 and FIG. 23, the pulley portion 470 of the second pulley 468 is rotated together with the first pulley 466 through the belt 474 such that they are rotated in the same direction. Further, the gear portion 472 provided under the pulley portion 470 is in mesh with the large gear 478 of the drive gear 476 so as to transmit the rotation of the loading motor 462 to the drive gear 476.

In this regard, it is to be noted that, as shown in FIG. 22, the second pulley 468 has a rotation axis which is common with the rotation axis of the cam wheel 484 describe later. In other words, the second pulley 468 is rotatable about the rotation axis 488 of the cam wheel 484. By employing such a structure, the same rotation axis can be used for the second pulley 468 and the cam wheel 484, which makes it possible to simplify a shape of a die for molding the loading chassis 120.

As shown in FIG. 24(*b*), the drive gear 476 includes a large gear 478 which is in mesh with the gear portion 472 of the second pulley 468, a small gear 482 which is co-axially formed with the under surface of the large gear 478 and which is in mesh with the a geared portion 492 of the cam wheel 484, and a middle gear 480 which is co-axially formed with the upper surface of the large gear 478 and which is in mesh with the rack gear 196 of the disc tray 160. These gears are formed into an integral body made of a synthetic resin material in the same manner as the second pulley 468.

The cam wheel 484 is rotatably displaceable with respect to the rotation axis 488 (see FIG. 22) between a first position shown in FIG. 22(*a*) and FIG. 23(*a*) and a second position shown in FIG. 22(*b*) and FIG. 23(*b*). When the cam wheel 484 is in the first position, it pivotally displaces the pivotal frame 340 to the raised position, and when the cam wheel 484 is in the second position, it pivotally displaces the pivotal frame 340 to the lowered position.

Figure 25:
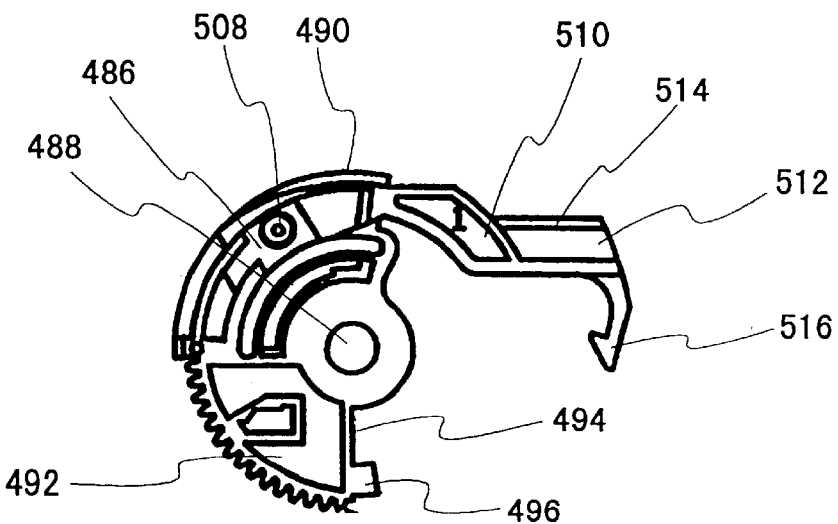
FIG. 25(a) is a top plan view of the cam wheel.
FIG. 25(b) is a side view thereof which is viewed from the side of the geared portion thereof.
Figure 25:
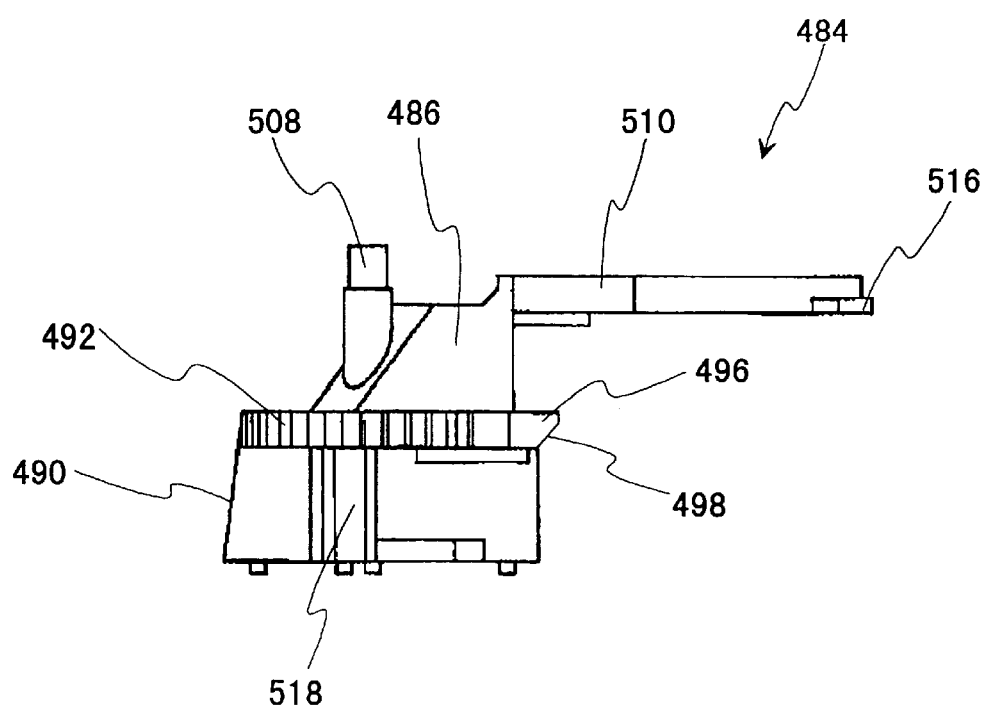

As shown in FIG. 23 and FIG. 25, the cam wheel 484 includes a cam portion 486 having an arc-shaped cam surface 490 which extends through 90 degrees with respect to the rotation axis 488, a geared portion 492 which extends from the upper part of the cam portion so as to form an arc-shape through 90 degrees and which is in mesh with the small gear 482 of the drive gear 476, and a locking arm 510 which is adapted to engage with the projecting member 356 of the pivotal frame 340 as well as the switching arm 520. These elements are formed into an integral body made from a synthetic resin material.

In more detail, as shown in FIG. 23 and FIG. 25, in the cam surface 490, there is formed a cam groove 500 in which the first guide pin 346 of the pivotal frame 340 is slidably engaged. As shown in FIG. 23, the cam groove 500 has an upper horizontal groove 502, a lower horizontal groove 504 and a slanting groove 506 which connects the upper and lower grooves 502, 504. When the cam wheel 484 is rotated between the first and second positions, the first guide pin 346 of the pivotal frame 340 is slidably moved in the up and down directions along the cam groove 500. Namely, when the cam wheel 484 is in its first position, the first guide pin 346 is in engagement with the upper groove 502 (see FIG. 23(*a*)) and the pivotal frame 340 is in the raised position. When the cam wheel 484 is rotated from the first position to the second position, the first guide pin 346 is lowered along the slanting groove 506. In accordance with the lowering motion of the first guide pin 346, the pivotal frame 340 is pivotally displaced from the raised position toward the lowered position. When the cam wheel 484 reaches at the second position, the first guide pin 346 is in engagement with the lower groove 504 (see FIG. 23(*b*)) and the pivotal frame 340 is in the lowered position.

As shown in FIG. 23(*b*) and FIG. 25(*b*), the cam surface 490 is formed into a diverging tapered surface so that an inwardly arched surface of the connecting portion 344 of the pivotal frame 340 on which the first guide pin 346 is provided does not contact with the cam surface 490 when the pivotal frame 340 is displaced to the lowered position.

Further, the loading cam mechanism 460 is also provided with an emergency eject mechanism for ejecting the disc tray 160 by manual operation using a pin-shaped member in the case where the loading motor 462 becomes disable due to power failure or the like under the condition that the disc tray 160 is in the reproducing position.

In more details, as shown in FIG. 23(*b*) and FIG. 25(*b*), in one vertical end surface of the cam portion 486 located at the side of the geared portion 492, there is formed a push surface 518. By pushing the push surface 518 with a pin-shaped member which is being inserted from the aperture 394 in the front bezel 390, it is possible to rotate the cam wheel 484 forcedly toward the clockwise direction in FIG. 22 to displace the feed chassis 220 from the raised position toward the lowered position, thereby ejecting the tip of the disc tray 160 out of the casing 360. In this connection, it is to be noted that since the push surface 518 is formed into a concave shape, it is possible to prevent the tip of the pin-shaped member from being disengaged from the push surface when pushing the push surf ace with the pin-shaped member.

Further, as shown in FIG. 23, on the upper surface of the cam portion 486, there is formed with the regulating pin 508 which is adapted to engage with the regulating grooves (178, 180, 182) formed on the under surface of the disc tray 160 for regulating the rotation of the cam wheel 484.

The geared portion 492 is formed with the arc-shaped gear extending through 90 degrees with respect to the rotation axis 488 of the cam wheel 484, as is well illustrated in FIG. 25(*a*). Further, the geared portion 492 is formed with an end surface 494 which extends radially from the rotation axis 488 to the end of the arc-shaped gear. On the end surface 494, there is formed a switching protrusion 496 having a slanting surface 498. The switching protrusion 496 pushes the disc tray closing switch 426 (see FIG. 10(*a*)) which protrudes from the base of the loading chassis 120 through its slanting surface 498 (see FIG. 25(*b*)) when the cam wheel 484 is rotated to reach the first position shown in FIG. 22(*a*).

The locking arm 510 extends from the cam portion 486 toward substantially tangential direction thereof as shown in FIG. 22, FIG. 23 and FIG. 25, and it has a locking part 512 and the hook 516 at the tip thereof. As described above, the locking part 512 is positioned below the projecting member 356 provided on the front part of the pivotal frame 340 to support the projecting member 356, when the pivotal frame 340 reaches at the raised position according to the rotation of the cam wheel 484 (see FIG. 14(*c*) and FIG. 23(*a*)), thereby supporting the pivotal frame 340 at its raised position. The locking part 512 is further formed with a slanting surface 524 for guiding the projecting member 356 of the pivotal frame 340 upwardly. Further, as shown in FIG. 22(*b*), the hook 516 is adapted to be engaged with a hook 534 of the switching arm 520 when the disc tray 160 has reached at the disc eject position, thereby locking the cam wheel 484 at the second position to restrict the rotational motion thereof.

Figure 26:
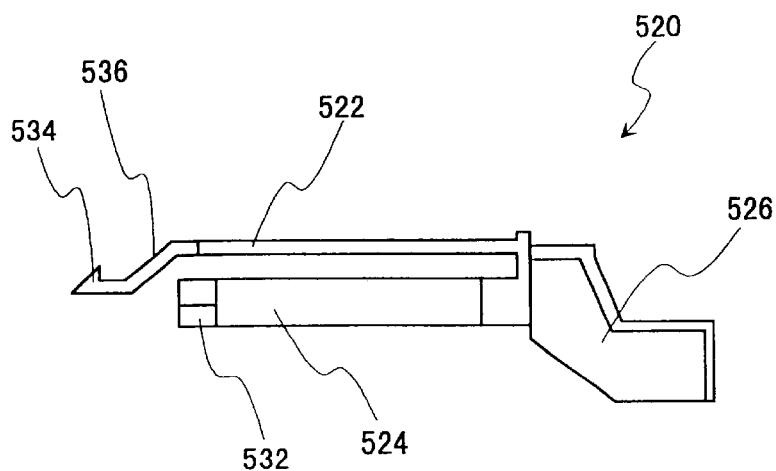
FIGS. 26(a), 26(b) and 26(c) are respectively a top plan view, a side view and a rear view of a switching arm, in which the side view is viewed from a side at which a hook is provided.
Figure 26:
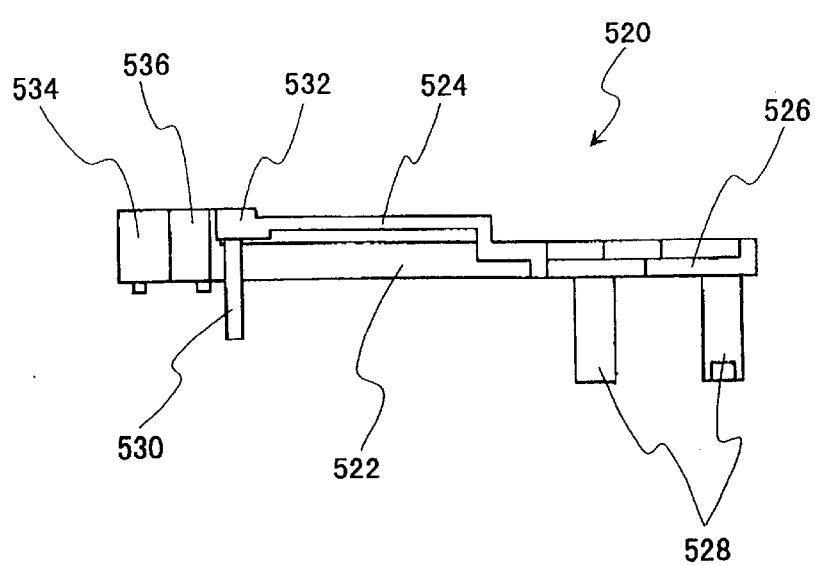
Figure 26:
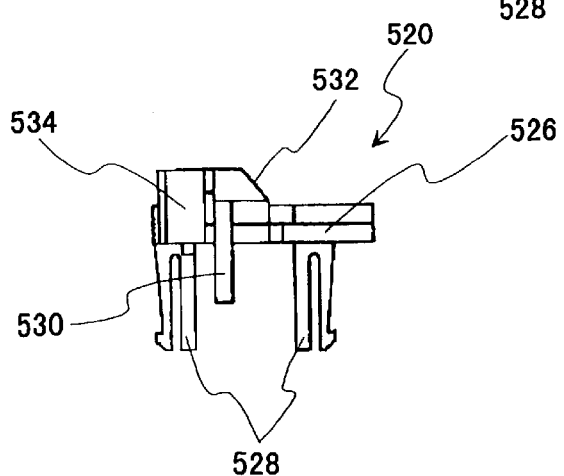
Figure 27:
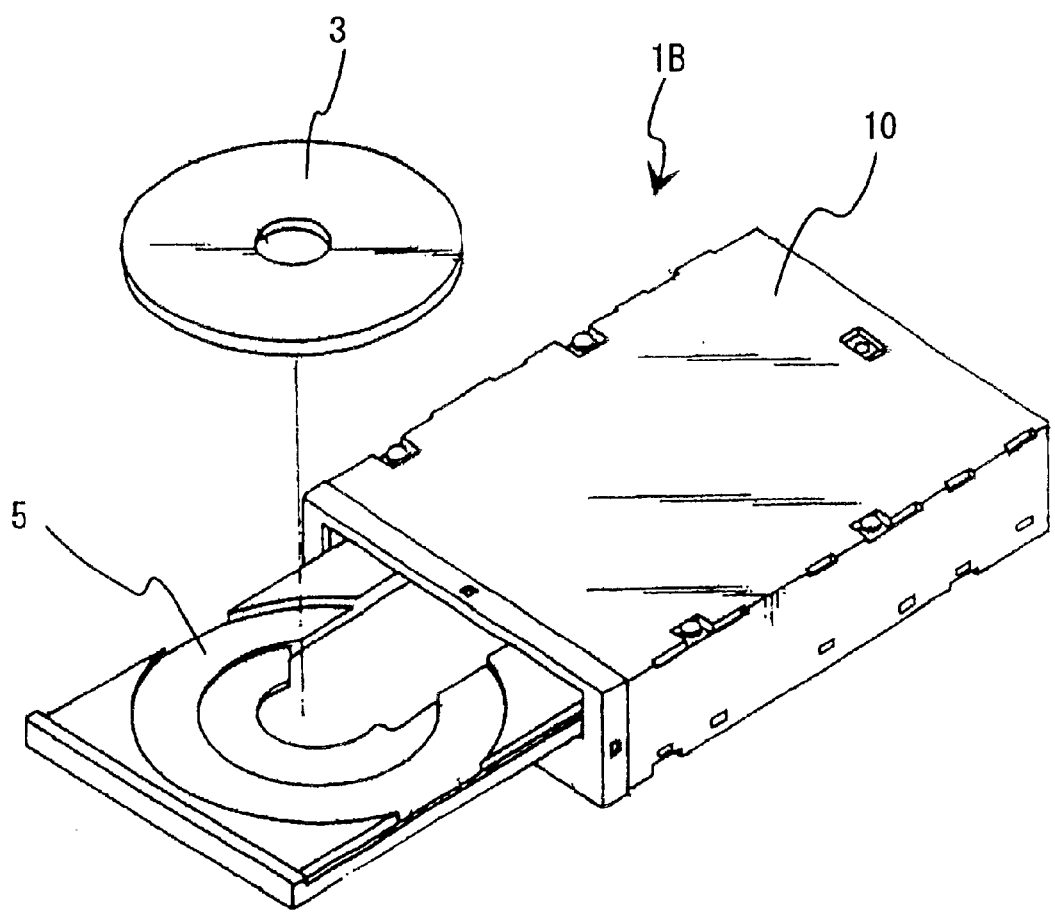
FIG. 27 is a perspective view which shows the overall structure of the conventional disc drive.
Figure 28:
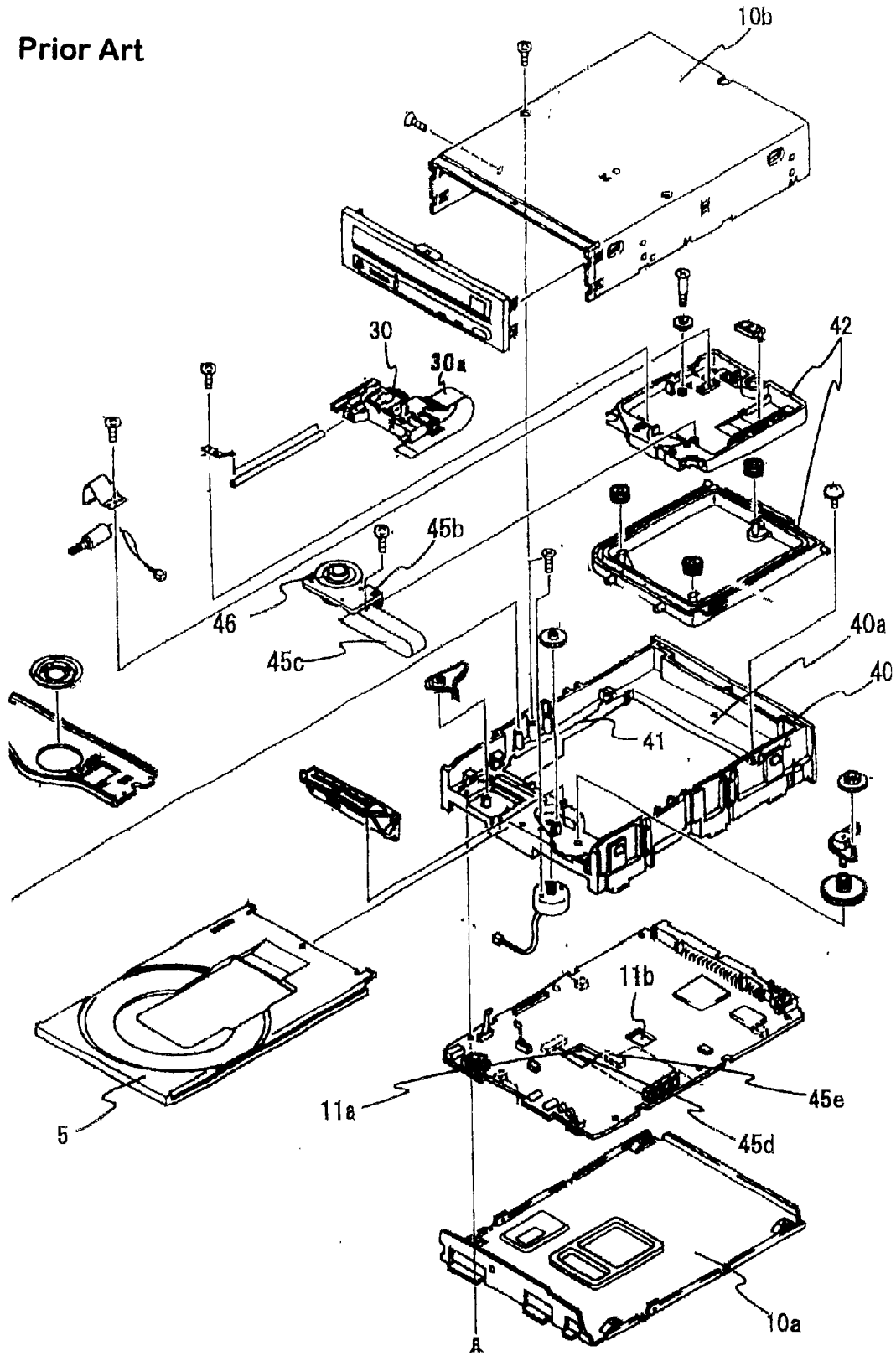
FIG. 28 is an exploded perspective view which shows the overall structure of the conventional disc drive.

The switching arm 520 is formed of a synthetic resin material, and, as shown in FIG. 26, it is comprised of a first arm 522 having the hook 534 which is engageable with the hook 516 of the cam wheel 484 for locking the cam wheel 484 at the second position as described above, a second arm 524 for operating (pushing) the disc tray opening switch 424, a base part 526 to which the first arm 522 and the second arm 524 are connected, and two leg portions 528 which extend downwardly form the base part 526 for mounting the switching arm 520 to the loading chassis 120.

In more details, as shown in FIG. 26, the first arm 522 has at its tip end the hook 534 which is engageable with the hook 516 of the cam wheel 484. Further, the first arm 522 is formed with a slanting surface portion 536 at the base side of the hook 534. This slanting surface portion 536 is adapted to be pushed by the first rib 186 formed on the under surface of the disc tray 160 when the disc tray 160 is in the disc reproducing position. When the slanting surface portion 536 is pushed by the first rib 186, the hook 534 of the first arm 522 is disengaged from the hook 516 of the cam wheel 484 to release the locking state of the cam wheel 484. In this regard, it is to be noted that the front side of the first arm 522 is in abutment with the inner wall of the loading chassis 120 so that it can be elastically deformed only rearwardly (see FIG. 22).

As shown in FIGS. 26(*b*) and (*c*), the second arm 524 has at its tip end a push rod 530 for operating (pushing) the disc tray opening switch 424. Further, on the upper portion of the push rod 530, there is formed a slanting surface portion 532. The slanting surface portion 532 comes to contact with the first rib 186 formed on the under surface of the disc tray 160 and then it is pushed by the first rib when the disc tray 160 is moved to the disc eject position, so that the push road 530 is pushed down to push the disc tray opening switch 424.

In this connection, in order to prevent excessive deformation of the first and second arms 522, 524, it is preferred that any means such as metallic plate springs or the like are provided behind the first arm 522 and below the second arm, respectively.

Hereinafter, operation of the disc drive 1A of the present invention will be described.

When the disc drive 1A is not in use, the disc tray 160 having no disc is in the disc reproducing position (see FIG. 4(*b*) and it is housed inside the casing 360. In this state, only the front-half part of the disc tray 160 is supported by the loading chassis 120 as shown in FIG. 4(*b*). Further, in this state, the feed chassis 220 is in the raised position, and the cam wheel 484 is in the first position shown in FIG. 22(*a*) and FIG. 23(*a*) where the first guide pin 346 of the pivotal frame 340 is positioned within the upper groove 502 of the cam wheel 484. Furthermore, in this state, the locking part 512 of the cam wheel 484 is positioned just below the projecting member 356 of the pivotal frame 340 which is in the raised position, and the regulating pin 508 of the cam wheel 484 is within the third regulating groove 182 of the disc tray 182 (see FIG. 16(*a*)). On the other hand, the drive gear 476 of the loading cam mechanism 460 is separated from the rack gear 196 of the disc tray 160, that is the drive gear 476 is not meshed with the rack gear 196.

When an eject operation is carried out in this state, the loading motor 462 rotates in the clockwise direction in FIG. 22(*a*) and thereby the cam wheel 484 also rotates in the same direction by means of the rotation speed reduction mechanism. In this case, the drive gear 476 is rotated in the counter clockwise direction. By the rotational motion of the cam wheel 484 in the clockwise direction (from the fist position toward the second position), the pivotal frame 340 is pivoted toward the lowered position so that the disc tray 160 is moved forwardly (out of the casing 360).

Specifically, when the cam wheel 484 is rotated in the clockwise direction, the locking part 512 is removed from the position below the projecting member 356 of the pivotal frame 340, and thereby the pivotal frame 340 becomes movable toward the lowered position. Further, in this state, the first guide pin 346 is guided from the upper groove 502 to the lower groove 504 through the slanting groove 506 according to the rotation of the cam wheel 484 toward the second position, and according to this movement of the first guide pin 346, the pivotal frame 340 and the feed chassis 220 are moved to their lowered positions.

Further, according to the rotation of the cam wheel 484, the regulating pin 508 of the cam portion 486 of the cam wheel 484 is moved from the third regulating groove 182 of the disc tray 160 into the second regulating groove 180 thereof, and then is being moved within the second regulating groove 180. By the movement of the guide pin 508 within the second regulating groove 180, the disc tray 160 is begun to move forwardly. By this forward movement of the disc tray 160, the rack gear 312 formed on the under surface of the disc tray 160 comes to engagement with the middle gear 480 of the drive gear 476 of the loading cam mechanism 460, so that the disc tray 160 is moved from the disc reproducing position toward the disc eject position. When the disc tray 160 reaches at the disc eject position, the first rib 186 formed on the under surface of the disc tray 160 pushes the upper portion of the push rod 530 of the switching arm 520 to push (turn off) the disc tray opening switch 424. When the disc tray opening switch 424 is turned off, the loading motor 462 is stopped.

Further, at this state, the cam wheel 484 is locked at the second position by the engagement of the hook 516 and the hook 534 as shown in FIG. 22(*b*). Further, when the cam wheel 484 is in the second position, the small gear 482 of the drive gear 476 is separated from the geared portion 492 of the cam wheel 484, so that they are disengaged with each other.

In this state, when a loading operation is carried out after the disc 100 is placed in the disc placing portion 162 of the disc tray 160 which has been in the disc eject position, the loading motor 462 rotates in the reverse direction (in the counter clockwise direction in FIG. 22(*b*)), and thereby the drive gear 476 also rotates in the clockwise direction in FIG. 8(*b*) through the rotation speed reduction mechanism. According to the rotation of the drive gear 476, the disc tray 160 moves rearwardly (that is, toward the rear of the disc drive 1A) toward the disc reproducing position. In this way, the disk 100 placed on the disc tray 160 is transported to the disc reproducing position.

During this loading operation of the disc tray (that is, during the rearward movement of the disc tray 160), the middle gear 480 of the drive gear 476 is in mesh with the rack gear 196 of the disc tray 160, that is the disc tray 160 is moved rearwardly according to the rotation of the middle gear 480 of the drive gear 476.

When the disc tray 160 approaches the disc reproducing position, the second rib 188 formed on the under surface of the disc tray 160 comes to contact with the slanting surface portion 536 of the hook 534 of the switching arm 520 (see FIG. 26) and then pushes it rearwardly. By this operation, the hook 534 is disengaged from the hook 516 of the cam wheel 484 to release the locking state of the cam wheel 484 at the second position so that the cam wheel becomes rotatable. When the regulating pin 508 of the cam wheel 484 reaches the first regulating groove 178 of the disc tray 160 (see FIG. 16(a)), the regulating pin 508 is guided through the first and second regulating grooves 178 and 180 in this order so that the cam wheel 484 is rotated in the counter clockwise direction. By this rotational motion of the cam wheel 484, the geared portion 492 of the cam wheel 484 come to engagement with the small gear 482 of the drive gear 476.

When the geared portion 492 of the came wheel 484 is engaged with the small gear of the drive gear 476, the cam wheel 484 is rotated from the first position toward the second position in accordance with the rotation of the cam wheel 484. Then, by this rotational motion of the cam wheel 484, the first guide pin 346 moves along the cam groove 500 so that the pivotal frame 340 is displaced toward the raised position in accordance with the guiding movement of the first guide pin 346, and thereby the feed chassis 22 is also displaced toward its raised position. Further, in this state, the locking part 512 of the cam wheel 484 is also displaced toward the position just below the projecting member 356 of the pivotal frame 340. In this state, the regulating pin 508 of the cam wheel 484 moves through the third regulating groove 182. In this way, the pivotal frame 340 is locked in its raised position.

In addition, when the cam wheel 484 reaches its first position, the protrusion 496 formed on the end surface 494 of the geared portion 492 of the cam wheel 484 pushes the disc tray closing switch 426. When this disc tray closing switch 426 is operated in this way, the loading motor 462 is stopped. Further, in this state, when the regulating pin 508 of the cam wheel 484 reaches the second regulating groove 180, the middle gear 480 of the drive gear 476 is separated from the rack gear 196 of the disc tray 160 and thereby they are disengaged with each other. With this result, the disc tray 160 is stopped.

In addition, as shown in FIG. 17(a), when the disc tray 160 approaches the disc reproducing position, the rear portion of the disc tray 160 is supported upwardly by the support spring 160 provided on the rear extending part 230 of the feed chassis 220. Then, when the disc tray 160 reaches the disc reproducing position, the engaging part 192 provided in the rear end portion of the disc tray 160 come to abutment with the engaged part 374 formed in the outer cover 362 to support the rear end portion of the disc tray 160 and further position it with respect to the outer cover 362 in the up and down direction.

Further, in this state, the center hub 282 of the turntable 280 of the feed chassis 220 is fitted into the center opening 102 of the disc 100 by the movement of the feed chassis 220 toward its raised position. Then, the disc clamper 376 provided on the outer cover 362 is attracted to the permanent magnet 284 of the turntable 280 so that the disc 100 is clamped therebetween.

If the playback switch or the like is turned on in this state, the turntable 280 is rotated by the rotation of the spindle motor. In accordance with the rotation of the turntable 280, the disc 100 is also rotated and the data is read out from and written in the rotating disc 100. Further, when the disc 100 is to be removed from the disc drive 1A after completion of the reproduction of the disc or interruption thereof, an eject operation (unloading operation) is carried by manipulating a predetermined switch or the like. In this eject operation, the operations described first are carried out again.

Hereinbelow, the process for assembling the disc drive 1A of the present invention will be described.

First, the feed chassis supporting members 400 and 400R are mounted on the bottom cover 380. In this state, the feed chassis supporting members 400L and 400R are firmly mounted on the bottom cover 380 by the engagement between each of the engaging protrusions 408 and each of the mounting portions 386, so that they are mounted on the bottom cover 380 in an unmovable manner.

Then, the main circuit board 200 is mounted on the bottom cover 380. In more details, first, the guide groove 202R of the main circuit board 200 is fitted with the guide rib 404R of the feed chassis supporting member 400R. Then, the main circuit board 200 is rotated about the fitting portion so that the main circuit board 200 is placed on the feed chassis supporting members 400R and 400L. In this case, by engaging the guide rib 404L of the feed chassis supporting member 400L with the guide groove 202L of the main circuit board 200 and then guiding the main circuit board 200 along the guide rib 404L, it is possible to place the main circuit board 200 on the feed chassis supporting members 400R and 400L easily. Then, the main circuit board 200 is displaced toward the left side feed cassis supporting member 400L so that the left edge of the main circuit board 200 is engaged with the engaging recess 406 of the feed chassis supporting member 400L (see FIG. 5(c)), thereby positioning the edge of the main circuit board 200 by the engagement with engaging recess 406. Then, the main circuit board 200 is fixed to the two circuit board mounting portions 388 of the bottom cover 380 with screws.

Next, the operation switch circuit board (small circuit board) 420 which is connected to the main circuit board 200 through the FFC 430 is mounted to the bottom of the loading chassis 120, and then the loading chassis 120 is mounted on the bottom cover 380. In this case, the engaging protrusions 144 formed on the left and right walls of the loading chassis 120 are respectively engaged with the mated engaged holes 384 of the bottom cover 380, so that the loading chassis 120 is fixedly mounted onto the bottom cover 380.

Next, the FFC 246 which is connected to the spindle motor 240 at one end thereof is connected to the FFC connector mounted on the main circuit board 200 at the other end thereof, and the FFC 204 which is connected to the main circuit board 200 at one end thereof is connected to the FFC connector 272 of the optical pick-up 250 provided on the feed chassis 220 at the other end thereof.

Next, the elastic members 540 are attached to the respective notches 234 of the base plate 222 of the feed chassis 200. Then, the elastic members attached to the base plate 222 are mounted to the projections 354, 354 formed on the pivotal frame 340 mounted on the loading chassis 120 and the projections 402 of the feed chassis supporting members 400R and 400L, respectively. Then, the elastic members 540 are secured to the pivotal frame 340 and the feed chassis supporting members 400R and 400L via screws 235.

Next, the disc tray 160 is mounted to the loading chassis 120 such that the step portions 166R and 166L of the disc tray 160 are slidably engaged with the upper surface holding members 136 formed on the upper surface of the loading chassis 120 and such that the guiding protrusions 138, 138 formed on the loading chassis 120 are respectively fitted within the corresponding guide grooves 174L and 174R.

Next, the outer cover 362 is attached to the bottom cover 380. Then, thus assembled casing 360 is reversed, and screws are fastened from the side of the bottom cover 380 to fix the operation switch circuit board 420 and the outer cover 362 to the bottom cover 380.

Then, the front bezel 390 is attached to the front portion of the casing, and the disc tray cover 398 is attached to the front portion of the disc tray 160.

The disc drive 1A of the present invention is assembled in accordance with the above steps. In this connection, it is to be noted that in this construction most of the internal components such as the feed chassis supporting members 400R and 400L, the main circuit board 200, the operation switch circuit board 420, the loading chassis 120, the feed chassis 220 and the disc tray 160 are directly or indirectly fixed with respect to the bottom cover 380. As a result, the casing 360 incorporating these components can be reversed during the assembling process. Further, due to the construction described above, it is possible to assemble the disc drive 1A easily.

Further, in the disc drive 1A of the present invention, a step for reversing the casing 360 is required to be carried out only once during the assembling process. In other words, by fastening screws from the side of the bottom cover 380, all the components are fixed with respect to the bottom cover 380. This means that the assembling process is simplified.

In the foregoing, the present invention has been described based on the preferred embodiment of the disc drive of the present invention. However, it is to be noted that the present invention can be applied to disc drives other than the optical disc drives such with CD-ROM drives and DVD drives.

As described above, according to the present invention, it is possible to provide a disc drive which has a simple structure and which can be easily assembled. In particular, the main circuit board can be easily mounted.

Finally, it should be also noted that even though the present invention was described above with reference to the embodiment shown in the drawings, the present invention is not limited thereto, and any additions or changes may be made without departing from the scope of the following claims.

What is claimed is:

1. A disc drive, comprising:
   a disc tray on which an optical disc is to be placed, the disc tray being movable between a disc ejecting position and a disc reproducing position in front and rear direction;
   a loading chassis which supports and guides the disc tray during the movement thereof;
   a feed chassis on which a turntable for rotating the disc and an pick-up at least for reproducing the optical disc are provided, said feed chassis having a rotation axis and a forward portion which is a front side of the rotation axis and on which the turntable and pick-up are arranged, and the front forward portion of the feed chassis being displaceable between a raised position and a lowered position about the rotation axis;
   a main circuit board having various electrical elements for controlling the turntable and the pick-up arranged on the feed chassis;
   a casing composed of a bottom cover and an outer cover for housing these elements, the bottom cover having left and right sides; and
   a pair of feed chassis supporting members respectively provided at the left and right sides of the bottom cover, in which the feed chassis is pivotally supported by the feed chassis supporting members and at least a part of the main circuit board is supported by the feed chassis supporting member wherein the bottom cover has a roughly front-half part and a roughly rear-half part, and the loading chassis is arranged on the front-half part and the main circuit board is arranged on the rear-half part, respectively, in such a manner that they are separated from each other.

2. The disc drive as claimed in claim 1, wherein one of the feed chassis supporting members is formed with a positioning means for positioning the main circuit board.

3. The disc drive as claimed in claim 2, wherein the main circuit board has a notch formed in one of side edges thereof, in which the positioning means includes a rib which is formed with the feed chassis supporting member so as to be engageable with the notch of the main circuit board.

4. The disc drive as claimed in claim 2, wherein one of the feed chassis supporting members is formed with a recess to which the main circuit board is fitted.

5. The disc drive as claimed in claim 1, wherein the bottom cover has a pair of upwardly protruding circuit board mounting portions which are located along one of the orthogonal lines of the main circuit board, and the main circuit board is mounted onto the circuit board mounting portion via screws.

6. The disc drive as claimed in claim 5, wherein one of the circuit board mounting portions is used for grounding the main circuit board.

7. The disc drive as claimed in claim 1, wherein the electrical parts on the main circuit board includes heat generating electrical parts which are mounted on the under surface of the main circuit board, and heat dissipation sheets are provided between the electrical parts and the bottom cover for transmitting heat generated in the electrical parts to the casing.

8. A disc drive, comprising:
   a casing having a bottom cover and an outer cover which is joined to the bottom to form a substantially box-shape, the bottom cover having a roughly front-half part and a roughly rear-half part;
   a disc tray on which an optical disc is to be placed, the disc tray being movable with respect to the casing between a disc ejecting position and a disc reproducing position in front and rear directions;
   a loading chassis provided within the casing for supporting and guiding the disc tray, the loading chassis being designed so that it is arranged on the front-half part of the bottom cover of the casing;
   a feed chassis which is provided within the casing and on which a turntable for rotating the disc and an pick-up at least for reproducing the disc are provided, the feed chassis being pivotally displaceable between a raised position at which the disc can be reproduced and a lowered position at which the disc tray can be moved between the disc reproducing position toward and the disc eject position; and
   a main circuit board having a roughly rectangular shape and having various electrical elements for driving and controlling the disc drive, the main circuit board being provided within the casing and designed so that it is arranged on the rear-half part of the bottom cover wherein the bottom cover has left and right sides and wherein the disc drive further comprises a pair of feed chassis supporting members which are respectively provided at the left and right sides of the bottom cover, in which the feed chassis is pivotally supported by the feed chassis supporting members and wherein the feed chassis is supported by the feed chassis supporting members through elastic members, and the feed chassis is pivotal with respect to an axis connecting the elastic members due to elastic deformation of the elastic members wherein the feed chassis includes a base plate formed into a roughly cross share having a front extending part, a right extending part, a left extending Part and a rear extending part, and the elastic members are provided on the right extending part and the left extending part of the base plate, respectively.

9. The disc as claimed in claim 8, wherein the feed chassis includes a base plate formed into a roughly cross shape having a front extending part, a right extending part, a left extending part and a rear extending part, and the base plate is designed so that its width including the right extending part and the left extending part is substantially equal to the width of the bottom cover.

10. The disc drive as claimed in claim 9, each of the right and left extending parts of the base plate has a rear corner, and the feed chassis is pivotal with respect to a pivotal axis connecting points near the rear corners of the right and left extending parts of the base plate.

11. The disc drive as claimed in claim 8, further comprising a mechanism for displacing the front extending part of the base plate in up and down directions.

12. The disc drive as claimed in claim 11, wherein the displacing mechanism includes a cam mechanism having a cam which converts rotational motion of the cam into the up and down motion of the front extending part of the base plate.

13. The disc drive as claimed in claim 8, wherein the disc tray has a rear end portion and the casing has a rear plate, in which the disc drive further comprises means for supporting and positioning the rear end portion of the disc tray with respect to the rear plate of the casing.

14. The disc drive as claimed in claim 13, wherein the supporting and positioning means includes engaging means elastically provided in the rear end portion of the disc tray and engaged means formed on the rear plate of the casing, wherein the engaging means comes to abutment with the engaged means with the engaging means being elastically deformed when the disc tray reaches the disc reproducing position.

15. The disc drive as claimed in claim 14, wherein the engaging means includes a pair of elastic arms which are inwardly provided at the opposite rear corners of the disc tray such that they face each other, and each elastic arm includes a leaf spring shaped elastic part which is flexible only in the front and rear directions and an engaging part formed on the tip part of the elastic part.

16. The disc drive as claimed in claim 15, the engaging part of each elastic arm is formed with a plurality of horizontal grooves and the engaged part of the rear plate of the casing is also formed with a plurality of corresponding horizontal grooves.

17. The disc drive as claimed in claim 8, further comprising means for preventing a disc which has been removed from the disc tray within the casing from being left inside the casing when the disc tray is ejected.

18. The disc drive as claimed in claim 17, wherein the casing has a top plate and the disc tray has a disc placing portion in which the disc is to be placed, in which the means includes a projection extending from the top plate toward the disc tray, and the projection is provided on the top plate so that the projection is positioned near and outside the outer periphery of the disc placing portion of the disc tray when the disc tray is in the reproduction position.

19. A disc drive, comprising:

a disc tray on which an optical disc is to be placed, the disc tray being movable between a disc ejecting position and a disc reproducing position in front and rear direction;

a loading chassis which supports and guides the disc tray a the during the movement thereof;

a feed chassis on which a turntable for rotating the disc and an pick-up at least for reproducing the optical disc are provided, said feed chassis having a rotation axis and a forward portion which is a front side of the rotation axis and on which the turntable and pick-up are arranged, and the front forward portion of the feed chassis being displaceable between a raised position and a lowered position about the rotation axis;

a main circuit board having various electrical elements for controlling the turntable and the pick-up arranged on the feed chassis;

a casing composed of a bottom cover and an outer cover for housing these elements, the bottom cover having left and right sides; and a pair of feed chassis supporting members respectively provided at the left and right sides of the bottom cover, in which the feed chassis is pivotally supported by the feed chassis supporting members and at least a part of the main circuit board is supported by the feed chassis supporting member wherein one of the feed chassis supporting members is formed with a positioning means for positioning the main circuit board wherein the main circuit board has a notch formed in one of side edges thereof, in which the positioning means includes a rib which is formed with the feed chassis supporting member so as to be engageable with the notch of the main circuit board.

20. A disc drive, comprising:

a disc tray on which an optical disc is to be placed, the disc tray being movable between a disc ejecting position and a disc reproducing position in front and rear direction;

a loading chassis which supports and guides the disc tray during the movement thereof;

a feed chassis on which a turntable for rotating the disc and an pick-up at least for reproducing the optical disc are provided, said feed chassis having a rotation axis and a forward portion which is a front side of the rotation axis and on which the turntable and pick-up are arranged, and the front forward portion of the feed chassis being displaceable between a raised position and a lowered position about the rotation axis;

a main circuit board having various electrical elements for controlling the turntable and the pick-up arranged on the feed chassis;

a casing composed of a bottom cover and an outer cover for housing these elements, the bottom cover having left and right sides; and a pair of feed chassis supporting members respectively provided at the left and right sides of the bottom cover, in which the feed chassis is pivotally supported by the feed chassis supporting members and at least a part of the main circuit board is supported by the feed chassis supporting member wherein one of the feed chassis supporting members is formed with a positioning means for positioning the main circuit board wherein one of the feed chassis supporting members is formed with a recess to which the main circuit board is fitted.

21. A disc drive, comprising:

a disc tray on which an optical disc is to be placed, the disc tray being movable between a disc ejecting position and a disc reproducing position in front and rear direction;

a loading chassis which supports and guides the disc tray during the movement thereof;

a feed chassis on which a turntable for rotating the disc and an pick-up at least for reproducing the optical disc are provided, said feed chassis having a rotation axis and a forward portion which is a front side of the rotation axis and on which the turntable and pick-up are arranged, and the front forward portion of the feed chassis being displaceable between a raised position and a lowered position about the rotation axis;

a main circuit board having various electrical elements for controlling the turntable and the pick-up arranged on the feed chassis;

a casing composed of a bottom cover and an outer cover for housing these elements, the bottom cover having left and right sides; and a pair of feed chassis supporting members respectively provided at the left and right sides of the bottom cover, in which the feed chassis is pivotally supported by the feed chassis supporting members and at least a part of the main circuit board is supported by the feed chassis supporting member wherein the bottom cover has a pair of upwardly protruding circuit board mounting portions which are located along one of the orthogonal lines of the main circuit board, and the main circuit board is mounted onto the circuit board mounting portion via screws.

22. The disc drive of claim 21 wherein one of the circuit board mounting portions is used for grounding the main circuit board.

23. A disc drive, comprising:

a disc tray on which an optical disc is to be placed, the disc tray being movable between a disc ejecting position and a disc reproducing position in front and rear direction;

a loading chassis which supports and guides the disc tray during the movement thereof;

a feed chassis on which a turntable for rotating the disc and an pick-up at least for reproducing the optical disc are provided, said feed chassis having a rotation axis and a forward portion which is a front side of the rotation axis and on which the turntable and pick-up are arranged, and the front forward portion of the feed chassis being displaceable between a raised position and a lowered position about the rotation axis;

a main circuit board having various electrical elements for controlling the turntable and the pick-up arranged on the feed chassis;

a casing composed of a bottom cover and an outer cover for housing these elements, the bottom cover having left and right sides; and a pair of feed chassis supporting members respectively provided at the left and right sides of the bottom cover, in which the feed chassis is pivotally supported by the feed chassis supporting members and at least a part of the main circuit board is supported by the feed chassis supporting member and wherein the electrical parts on the main circuit board include heat generating electrical parts which are mounted on the under surface of the main circuit board, and heat dissipation sheets are provided between the electrical parts and the bottom cover for transmitting heat generated in the electrical parts to the casing.

24. A disc drive, comprising:

a casing having a bottom cover and an outer cover which is joined to the bottom to form a substantially box-shape, the bottom cover having a roughly front-half part and a roughly rear-half part;

a disc tray on which an optical disc is to be placed, the disc tray being movable with respect to the casing between a disc ejecting position and a disc reproducing position in front and rear directions; a loading chassis provided within the casing for supporting and guiding the disc tray, the loading chassis being designed so that it is arranged on the front-half part of the bottom cover of the casing;

a feed chassis which is provided within the casing and on which a turntable for rotating the disc and an pick-up at least for reproducing the disc are provided, the feed chassis being pivotally displaceable between a raised position at which the disc can be reproduced and a lowered position at which the disc tray can be moved between the disc reproducing position toward and the disc eject position;

a main circuit board having a roughly rectangular shape and having various electrical elements for driving and controlling the disc drive, the main circuit board being provided within the casing and designed so that it is arranged on the rear-half part of the bottom cover; and a mechanism for displacing the front extending part of the base plate in up and down directions wherein the displacing mechanism includes a cam mechanism having a cam which converts rotational motion of the cam into the up and down motion of the front extending part of the base plate.

25. A disc drive, comprising:

a casing having a bottom cover and an outer cover which is joined to the bottom to form a substantially box-shape, the bottom cover having a roughly front-half part and a roughly rear-half part;

a disc tray on which an optical disc is to be placed, the disc tray being movable with respect to the casing between a disc ejecting position and a disc reproducing position in front and rear directions;

a loading chassis provided within the casing for supporting and guiding the disc tray, the loading chassis being designed so that it is arranged on the front-half part of the bottom cover of the casing;

a feed chassis which is provided within the casing and on which a turntable for rotating the disc and an pick-up at least for reproducing the disc are provided, the feed chassis being pivotally displaceable between a raised position at which the disc can be reproduced and a lowered position at which the disc tray can be moved between the disc reproducing position toward and the disc eject position; and a main circuit board having a roughly rectangular shape and having various electrical elements for driving and controlling the disc drive, the main circuit board being provided within the casing and designed so that it is arranged on the rear-half part of the bottom cover wherein the disc tray has a rear end portion and the casing has a rear plate, in which the disc drive further comprises means for supporting and positioning the rear end portion of the disc tray with respect to the rear plate of the casing.

26. The disc drive of claim 25 wherein the supporting and positioning means includes engaging means elastically provided in the rear end portion of the disc tray and engaged means formed on the rear plate of the casing, wherein the engaging means comes to abutment with the engaged means with the engaging means being elastically deformed when the disc tray reaches the disc reproducing position.

27. The disc drive of claim 26 wherein the engaging means includes a pair of elastic arms which are inwardly provided at the opposite rear corners of the disc tray such that they face each other, and each elastic arm includes a leaf spring shaped elastic part which is flexible only in the front and rear directions and an engaging part formed on the tip part of the elastic part.

28. The disc drive of claim 27 wherein the engaging part of each elastic arm is formed with a plurality of horizontal grooves and the engaged part of the rear plate of the casing is also formed with a plurality of corresponding horizontal grooves.

29. A disc drive, comprising:

- a casing having a bottom cover and an outer cover which is joined to the bottom to form a substantially box-shape, the bottom cover having a roughly front-half part and a roughly rear-half part;
- a disc tray on which an optical disc is to be placed, the disc tray being movable with respect to the casing between a disc ejecting position and a disc reproducing position in front and rear directions;
- a loading chassis provided within the casing for supporting and guiding the disc tray, the loading chassis being designed so that it is arranged on the front-half part of the bottom cover of the casing;
- a feed chassis which is provided within the casing and on which a turntable for rotating the disc and an pick-up at least for reproducing the disc are provided, the feed chassis being pivotally displaceable between a raised position at which the disc can be reproduced and a lowered position at which the disc tray can be moved between the disc reproducing position toward and the disc eject position;
- a main circuit board having a roughly rectangular shape and having various electrical elements for driving and controlling the disc drive, the main circuit board being provided within the casing and designed so that it is arranged on the rear-half part of the bottom cover; and
- means for preventing a disc which has been removed from the disc tray within the casing from being left inside the casing when the disc tray is ejected.

30. The disc drive of claim 29 wherein the casing has a top plate and the disc tray has a disc placing portion in which the disc is to be placed, in which the means includes a projection extending from the top plate toward the disc tray, and the projection is provided on the top plate so that the projection is positioned near and outside the outer periphery of the disc placing portion of the disc tray when the disc tray is in the reproducing position.

* * * * *

UNITED STATES PATENT AND TRADEMARK OFFICE
CERTIFICATE OF CORRECTION

PATENT NO.    : 6,693,868 B2
DATED         : February 17, 2004
INVENTOR(S)   : Saito It is certified that error appears in the above-identified patent and that said Letters Patent is hereby corrected as shown below:

Column 2,
Line 42, change "cam" to -- can --

Column 7,
Line 35, delete ";"

Column 8,
Line 40, change "would be happened" to -- would happen --
Line 43, change "being happed" to -- happening --

Column 11,
Line 42, change "L20" to -- 120 --

Column 17,
Lines 14 and 23, change "damper" to -- clamper --
Line 16, change "surfaced" to -- surface --

Column 19,
Line 26, change "bean" to -- beam --
Line 48, change "hind" to -- hinder --
Lines 59-60, change "this does not necessitate to apply a" to -- this does not necessitate application of a --

Column 22,
Line 17, change "disable" to -- disabled --
Line 33, change "surf ace" to -- surface --

Column 24,
Line 4, change "fist" to -- first --

UNITED STATES PATENT AND TRADEMARK OFFICE
CERTIFICATE OF CORRECTION

PATENT NO. : 6,693,868 B2
DATED : February 17, 2004
INVENTOR(S) : Saito

It is certified that error appears in the above-identified patent and that said Letters Patent is hereby corrected as shown below:

Column 25,
Line 12, change "came" to -- cam --

Column 29,
Line 5, change "Part" to -- part --

Signed and Sealed this

Thirteenth Day of July, 2004

JON W. DUDAS
*Acting Director of the United States Patent and Trademark Office*